(12) United States Patent
Han et al.

(10) Patent No.: US 11,649,566 B2
(45) Date of Patent: May 16, 2023

(54) GRAPHENE FIBER AND METHOD OF MANUFACTURING THE SAME

(71) Applicant: IUCF-HYU (INDUSTRY-UNIVERSITY COOPERATION FOUNDATION HANYANG UNIVERSITY), Seoul (KR)

(72) Inventors: Tae Hee Han, Namyangju-si (KR); Hun Park, Busan (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 95 days.

(21) Appl. No.: 17/240,528

(22) Filed: Apr. 26, 2021

(65) Prior Publication Data

US 2021/0246580 A1    Aug. 12, 2021

Related U.S. Application Data

(63) Continuation-in-part of application No. 16/156,367, filed on Oct. 10, 2018, now Pat. No. 10,995,428,
(Continued)

(30) Foreign Application Priority Data

Apr. 11, 2016 (KR) .................. 10-2016-0044225
Apr. 11, 2016 (KR) .................. 10-2016-0044228
(Continued)

(51) Int. Cl.
*D01F 9/12* (2006.01)
*C01B 32/184* (2017.01)
(Continued)

(52) U.S. Cl.
CPC .............. *D01F 9/12* (2013.01); *C01B 32/184* (2017.08); *D01F 11/127* (2013.01); *H01B 1/04* (2013.01);
(Continued)

(58) Field of Classification Search
CPC .......... D01F 9/12; D01F 11/127; D01F 11/12; D01F 11/14; C01B 32/184; C01B 32/182;
(Continued)

(56) References Cited

U.S. PATENT DOCUMENTS

2007/0117951 A1    5/2007  Palmer, Jr. et al.
2012/0251824 A1   10/2012  Hur et al.
(Continued)

FOREIGN PATENT DOCUMENTS

CN    102534868 A    7/2012
CN    103233296 A    8/2013
(Continued)

OTHER PUBLICATIONS

Definition of "as," accessed online at https://www.dictionary.com/browse/as on Sep. 24, 2022 (Year: 2022).*
(Continued)

*Primary Examiner* — Daniel C. McCracken
(74) *Attorney, Agent, or Firm* — Sughrue Mion, PLLC

(57) ABSTRACT

A method of manufacturing a graphene fiber is provided. The method includes preparing a source solution including graphene oxide, supplying the source solution into a base solution containing a foreign element to form a graphene oxide fiber, separating the graphene fiber from the base solution and cleaning and drying to obtain the graphene oxide fiber containing the foreign element, and performing thermal treatment to the dried graphene oxide fiber containing the foreign element to form a graphene fiber doped with the foreign element. Elongation percentage of the graphene
(Continued)

fiber is adjusted by concentration and spinning rate of the source solution.

9 Claims, 35 Drawing Sheets

Related U.S. Application Data which is a continuation of application No. PCT/KR2017/003930, filed on Apr. 11, 2017.

(30) Foreign Application Priority Data

Aug. 19, 2016 (KR) .................. 10-2016-0105541
Jan. 31, 2017 (KR) .................. 10-2017-0013852

(51) Int. Cl.
*D01F 11/12* (2006.01)
*H01B 5/02* (2006.01)
*H01B 1/04* (2006.01)

(52) U.S. Cl.
CPC ......... *H01B 5/02* (2013.01); *D10B 2101/122* (2013.01); *D10B 2401/10* (2013.01)

(58) Field of Classification Search
CPC .......... C01B 32/198; H01B 1/04; H01B 5/02; D10B 2101/122; D10B 2401/10; D01D 5/06; D01D 1/02
See application file for complete search history.

(56) References Cited

U.S. PATENT DOCUMENTS

| | | | | |
|---|---|---|---|---|
| 2012/0298396 A1* | 11/2012 | Hong | ............. | B82Y 30/00 |
| | | | | 977/734 |
| 2013/0272950 A1 | 10/2013 | Yun et al. | | |
| 2014/0004344 A1* | 1/2014 | Kim | ............. | D01D 1/06 |
| | | | | 428/367 |
| 2015/0064463 A1* | 3/2015 | Wu | ............. | D01F 9/12 |
| | | | | 423/447.2 |
| 2015/0093572 A1 | 4/2015 | Zhou et al. | | |
| 2015/0111449 A1* | 4/2015 | Cruz-Silva | ......... | B01D 39/2065 |
| | | | | 428/688 |
| 2018/0209075 A1* | 7/2018 | Lian | ............. | D01D 5/06 |

FOREIGN PATENT DOCUMENTS

| | | |
|---|---|---|
| CN | 104420007 A | 3/2015 |
| JP | 6004507 B2 | 10/2016 |
| KR | 10-2010-0089844 A | 8/2010 |
| KR | 10-2011-0031826 A | 3/2011 |
| KR | 10-2011-0078254 A | 7/2011 |
| KR | 10-2012-0107026 A | 9/2012 |
| KR | 10-2012-0111661 A | 10/2012 |
| KR | 10-1328876 B1 | 11/2013 |

OTHER PUBLICATIONS

Jalili, et al., Scalable One-Step Wet-Spinning of Graphene Fibers and Yarns from Liquid Crystalline Dispersions of Graphene Oxide: Towards Multifunctional Textiles, Adv. Funct. Mater. 2013; 23: 5345-5354 (Year: 2013).*

Yern Seung Kim, et al., "Easy Preparation of Readily Self-Assembled High-Performance Graphene Oxide Fibers", Chemistry of Materials, 2014; pp. 5549-5555, vol. 26.

Yunzhen Chang, et al., "Larger-scale fabrication of N-doped graphene-fiber mats used in high-performance energy storage", Journal of Power Sources, 2014, pp. 113-121, vol. 252.

Zheng Liu, et al., "Wet-Spun Continuous Graphene Films", Chemistry of Materials, 2014, pp. 6786-6795, vol. 26.

International Search Report for PCT/KR2017/003930 dated Jul. 19, 2017 [PCT/ISA/210].

Jalili, et al., Scalable One-Step Wet-Spinning of Graphene Fibers and Yarns from Liquid Crystalline Dispersions of Graphene Oxide: Towards Multifunctional Textiles with Supporting Information, Adv. Funct. Mater. 2013; 23: 5345-5354 (Year: 2013).

* cited by examiner

[Fig. 1]
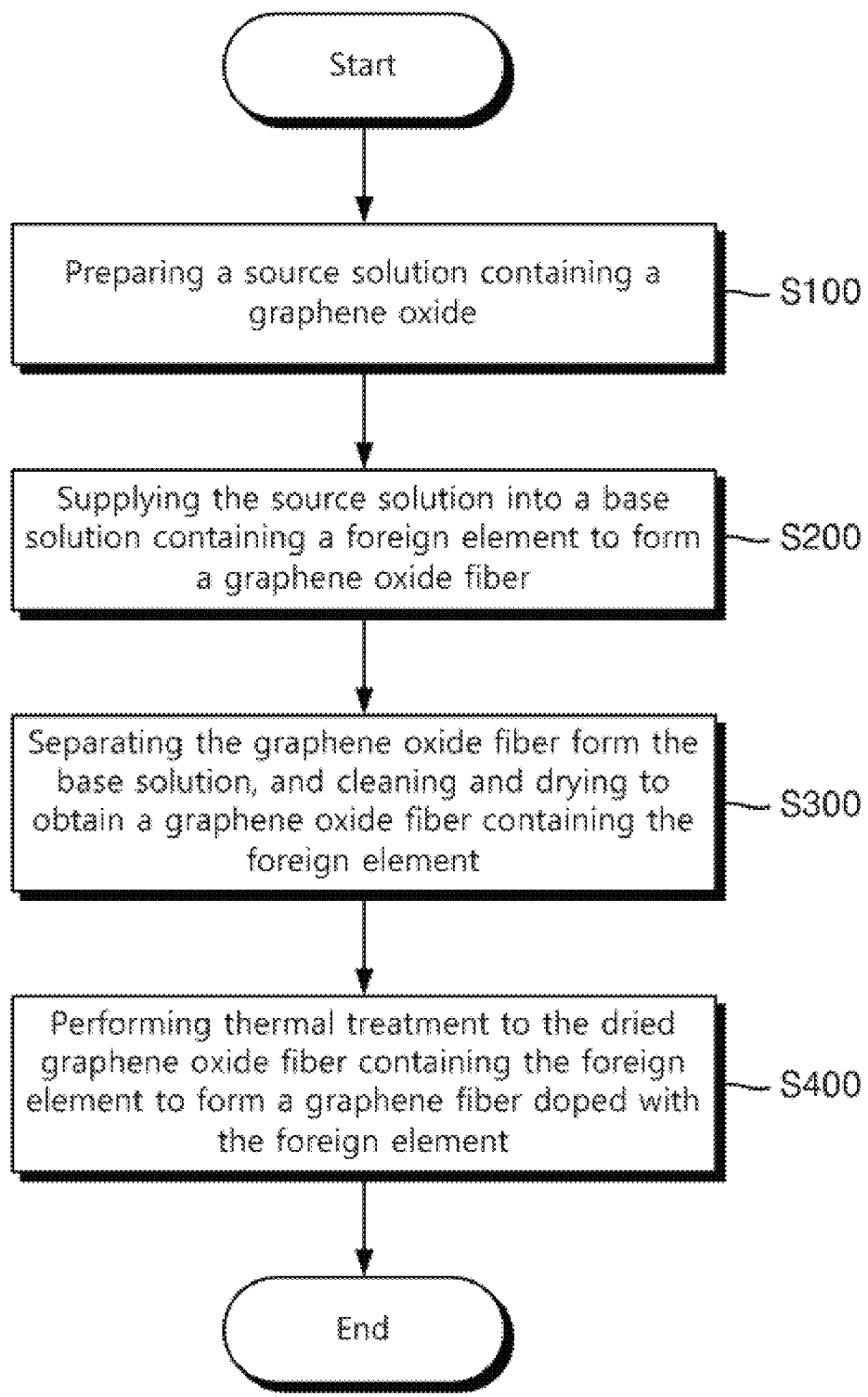

[Fig. 2]
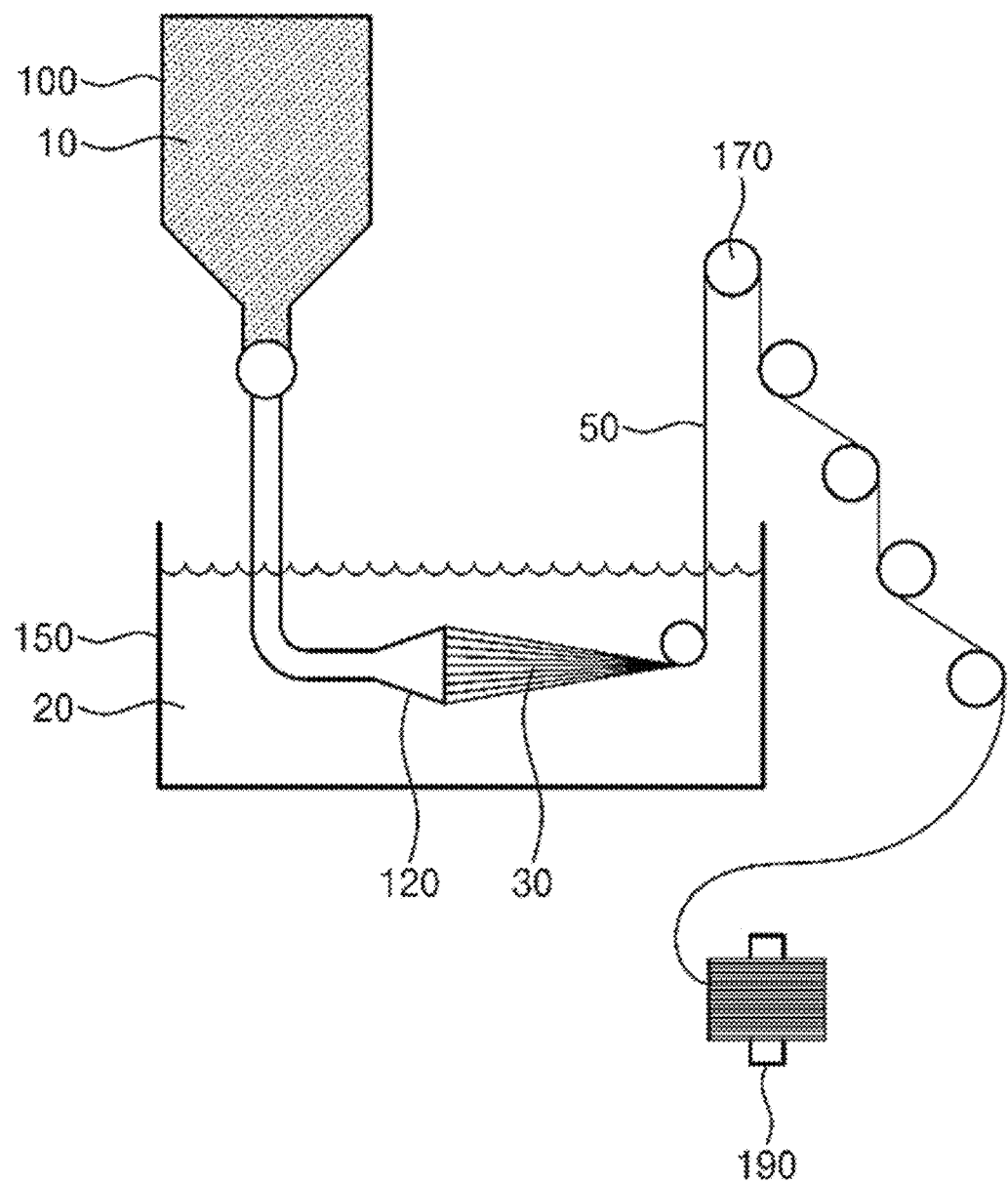

[Fig. 3]
a) 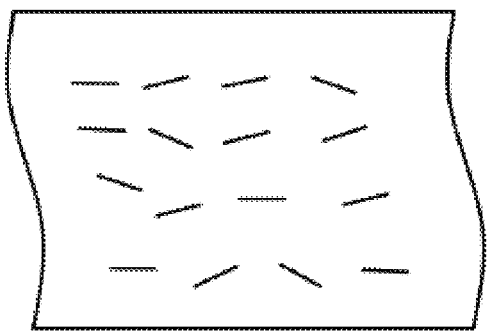
70
b) 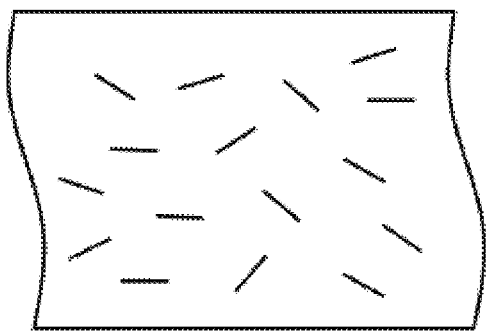
70

[Fig. 4]
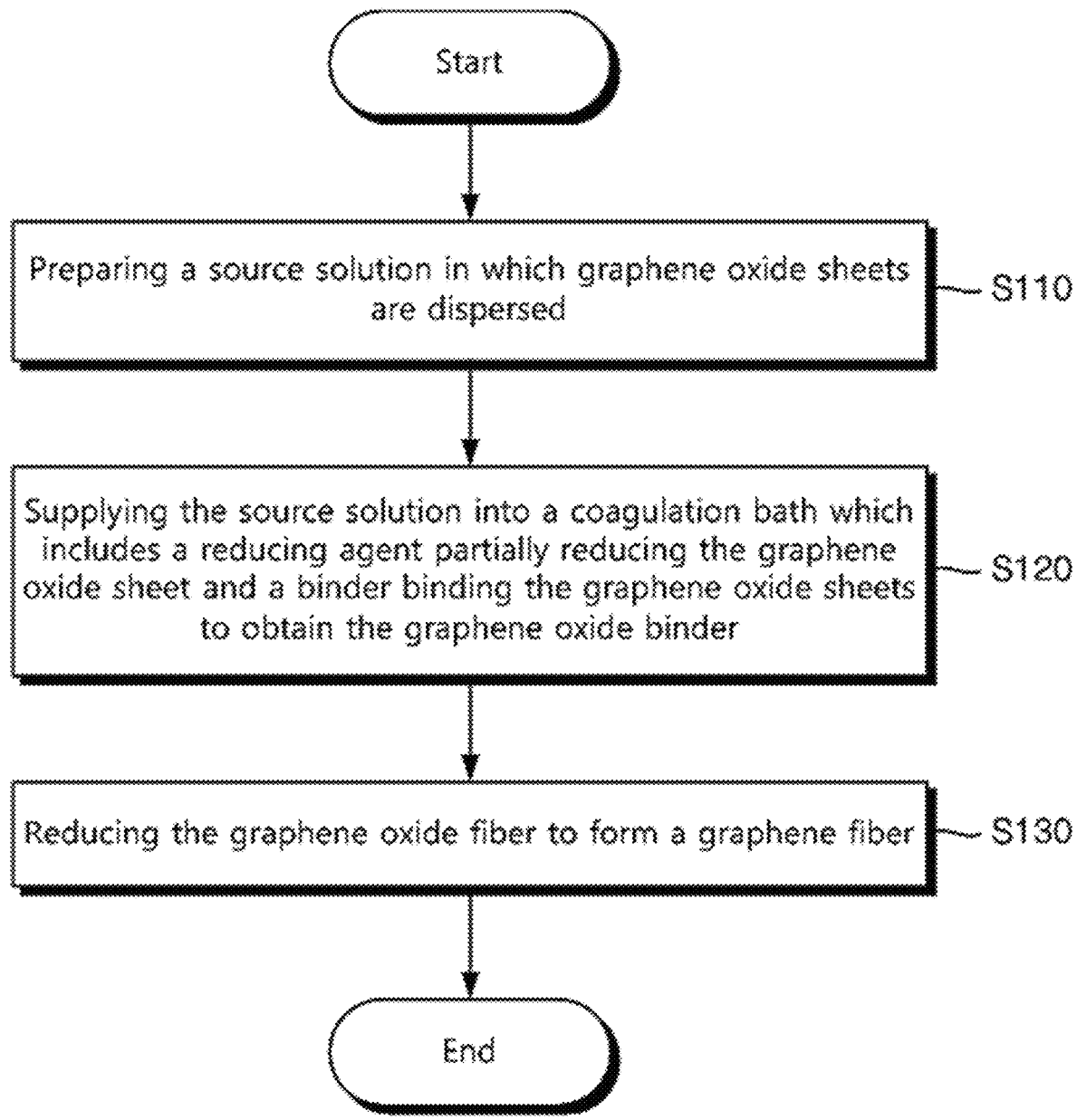

[Fig. 5]
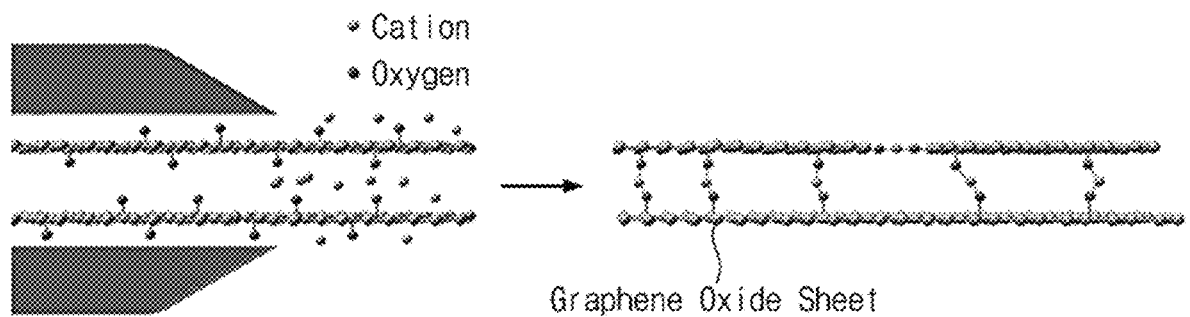

[Fig. 6a]
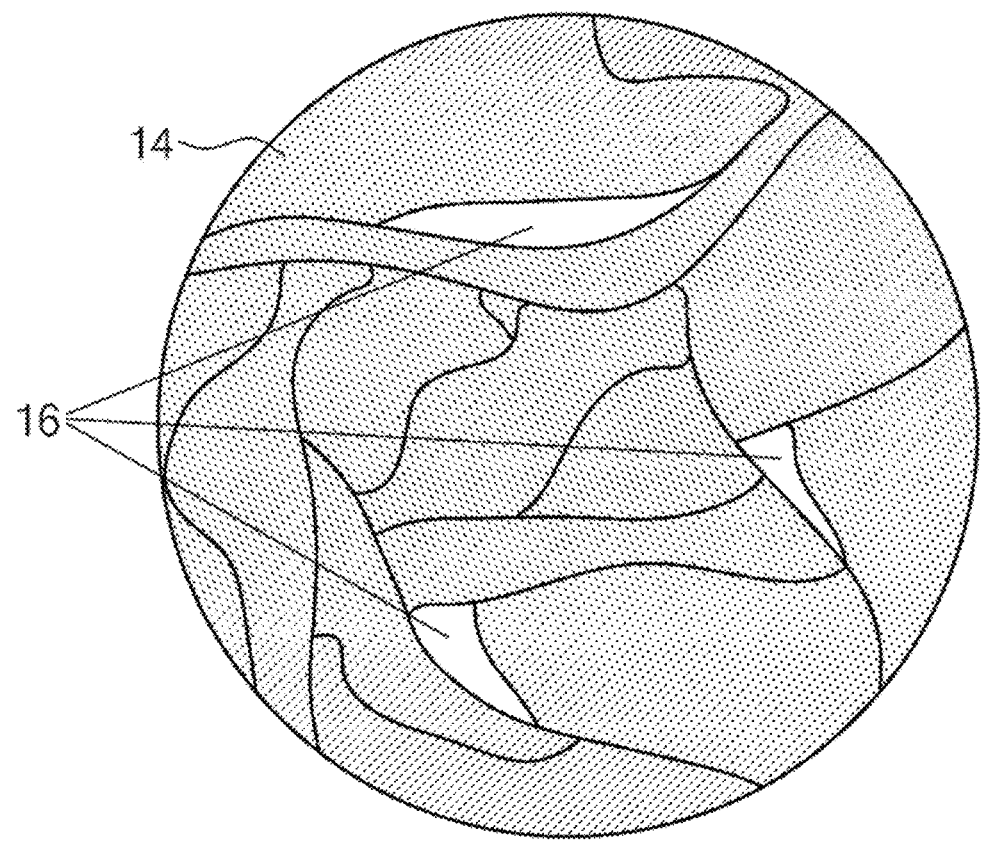

[Fig. 6b]
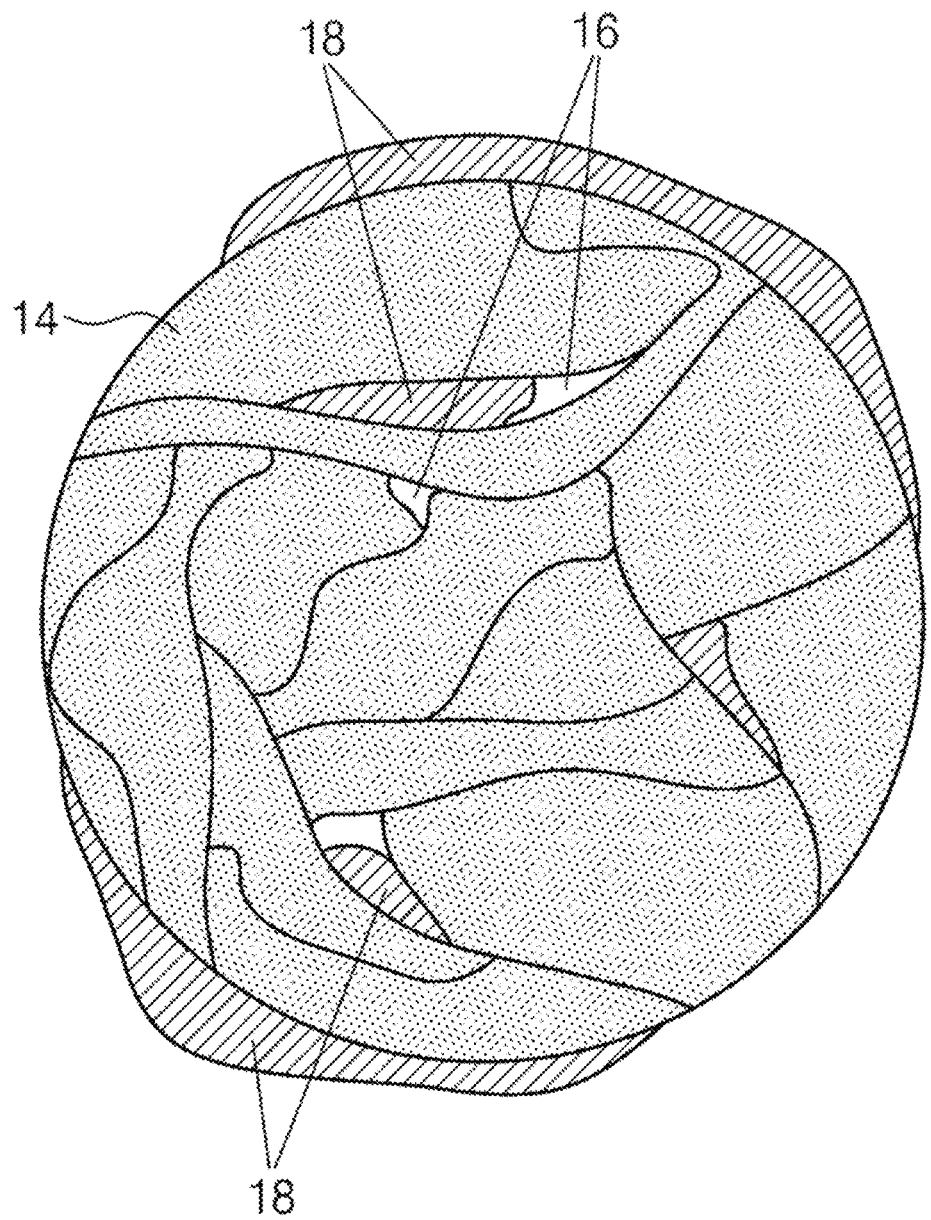

[Fig. 7]
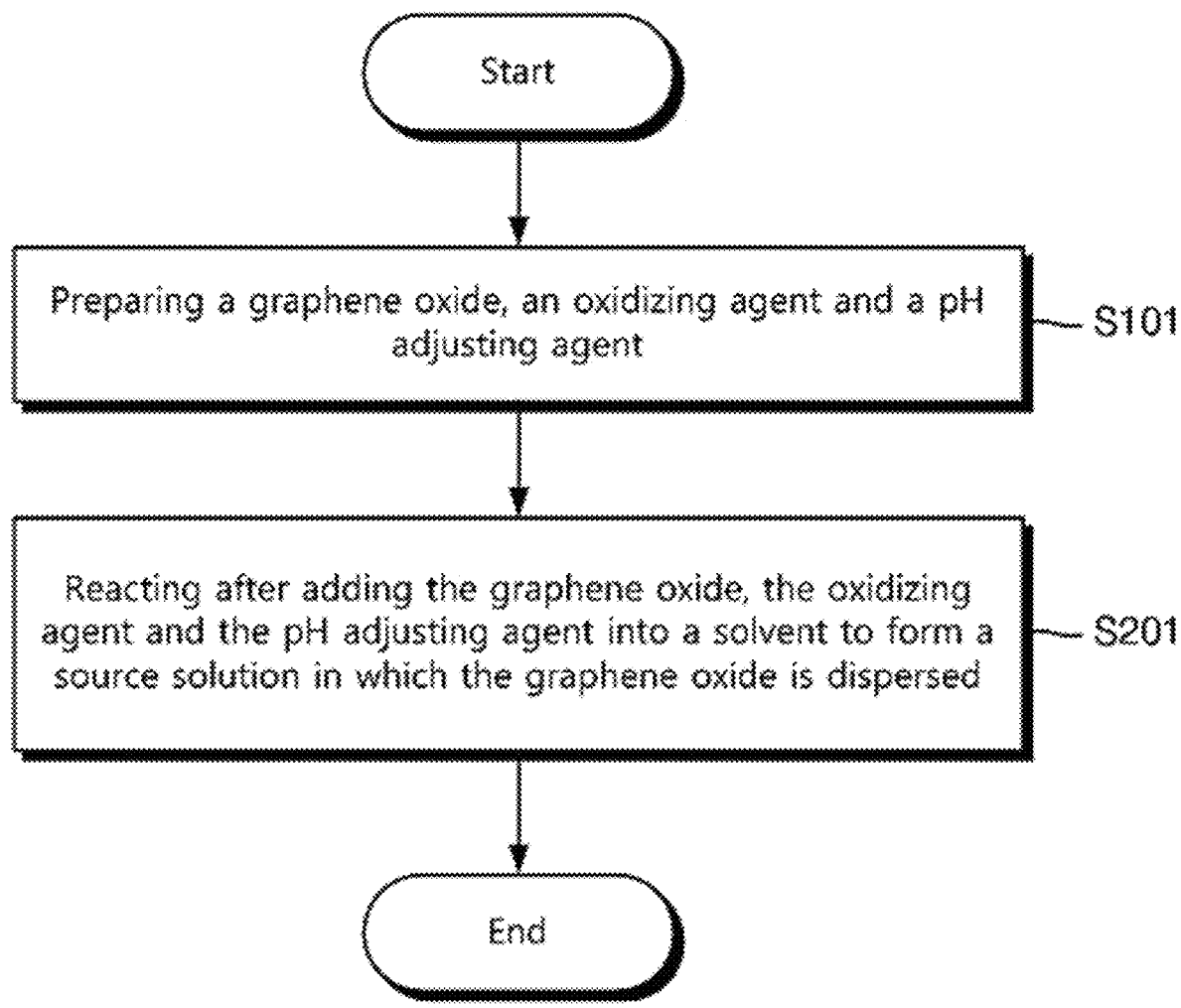

[Fig. 8]
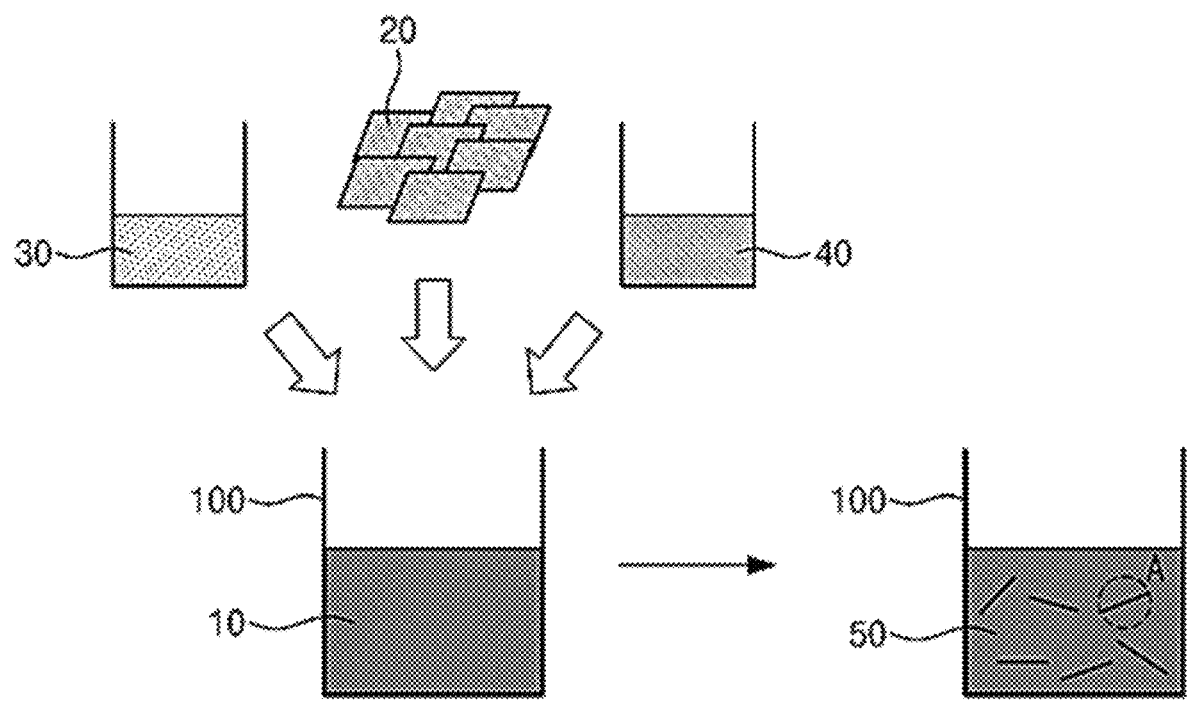

[Fig. 9]
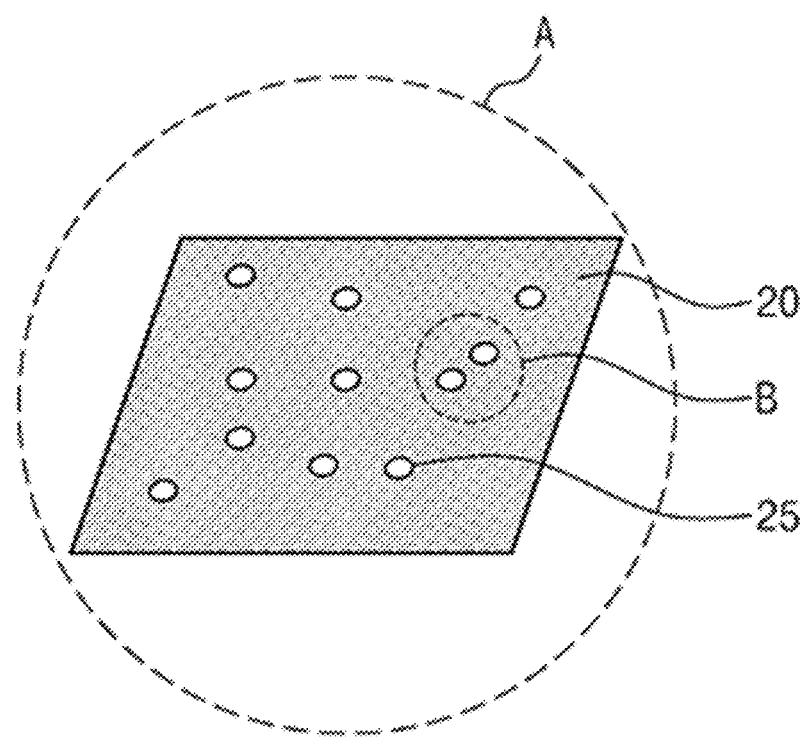

[Fig. 10]
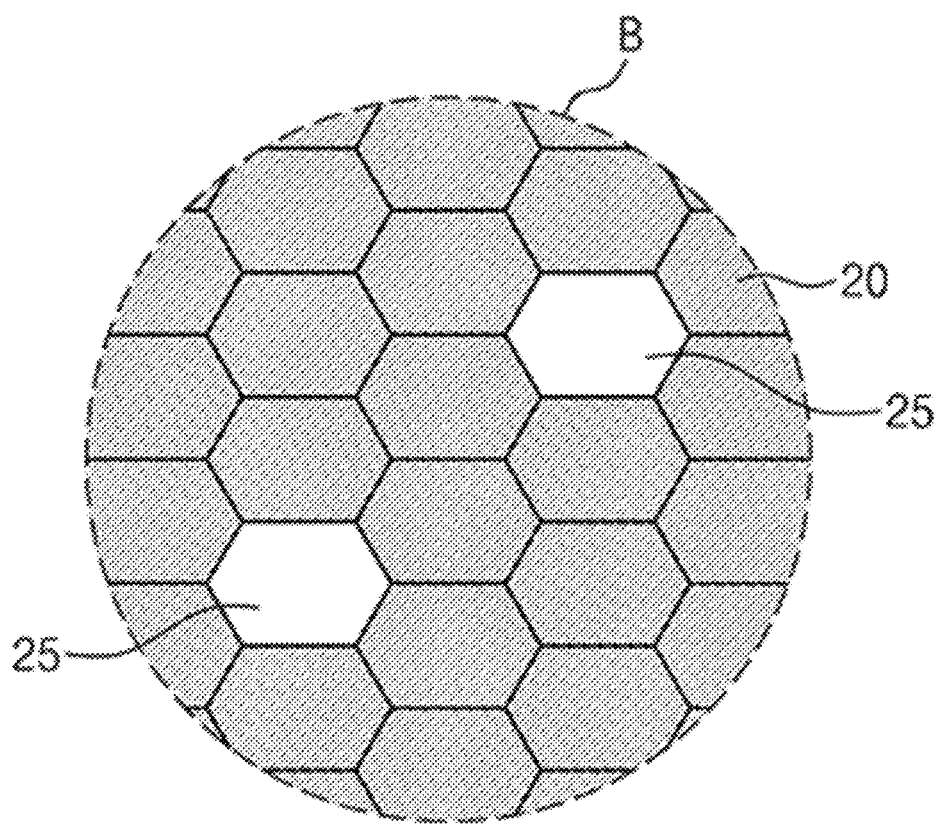

[Fig. 11]
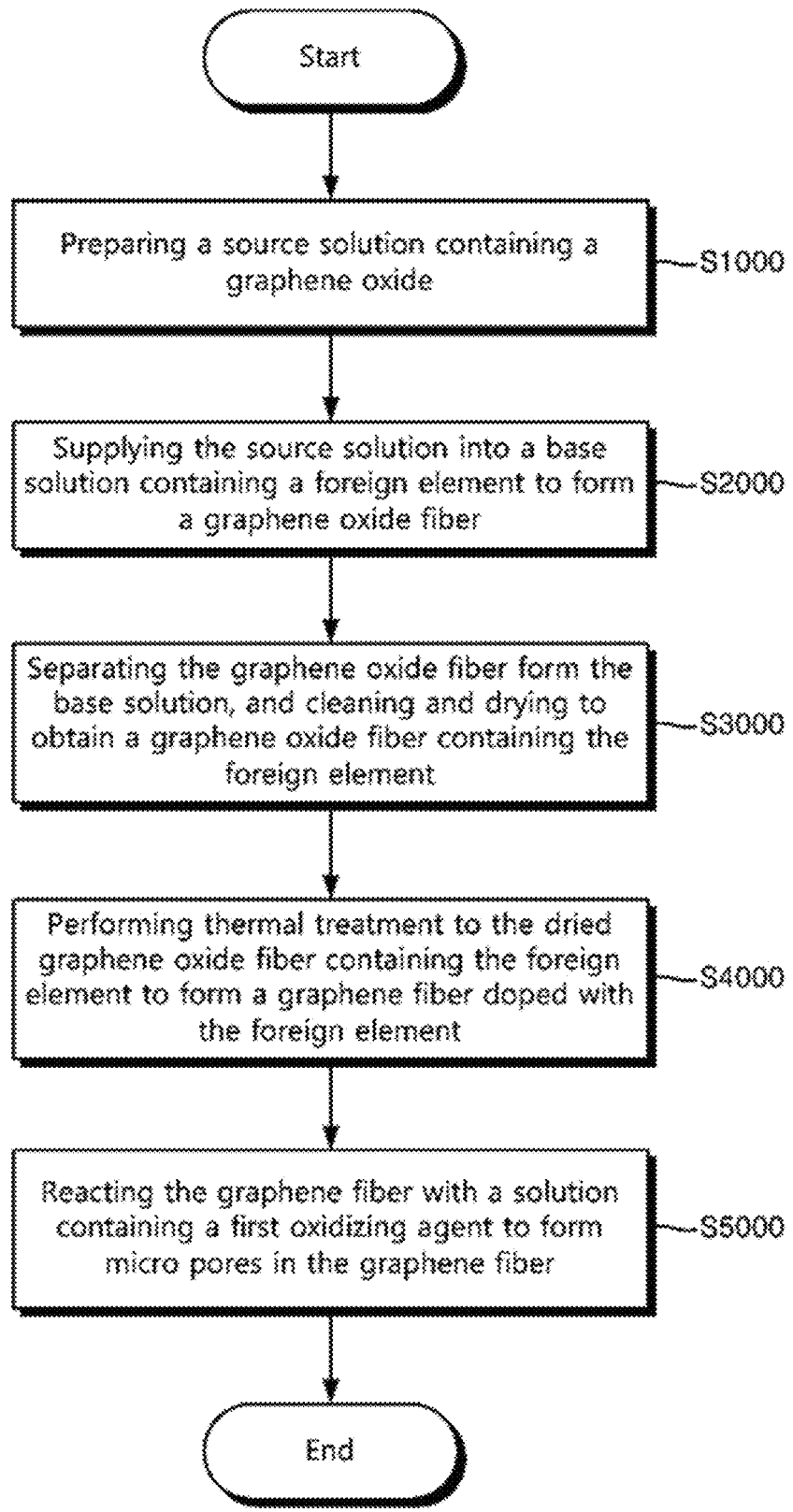

[Fig. 12]
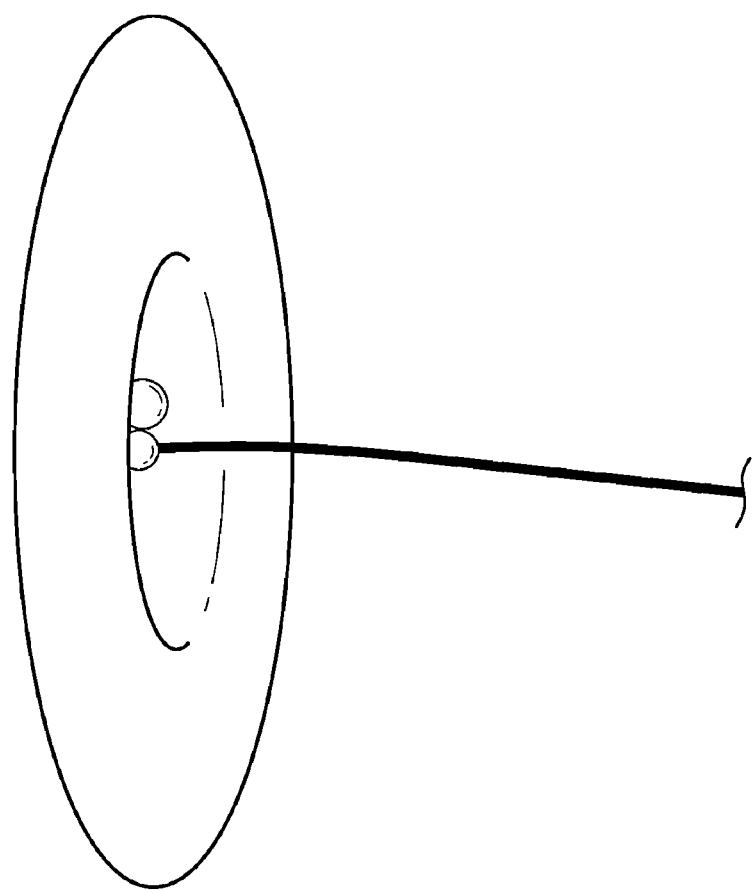

【Fig. 13】
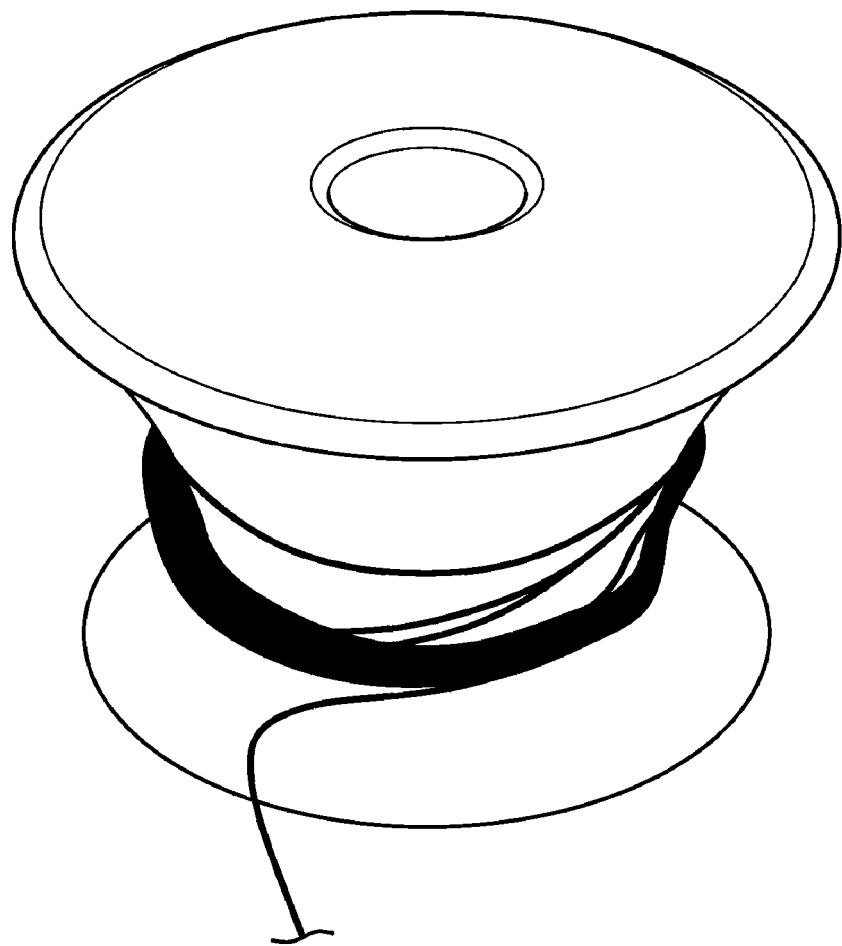

[Fig. 14]
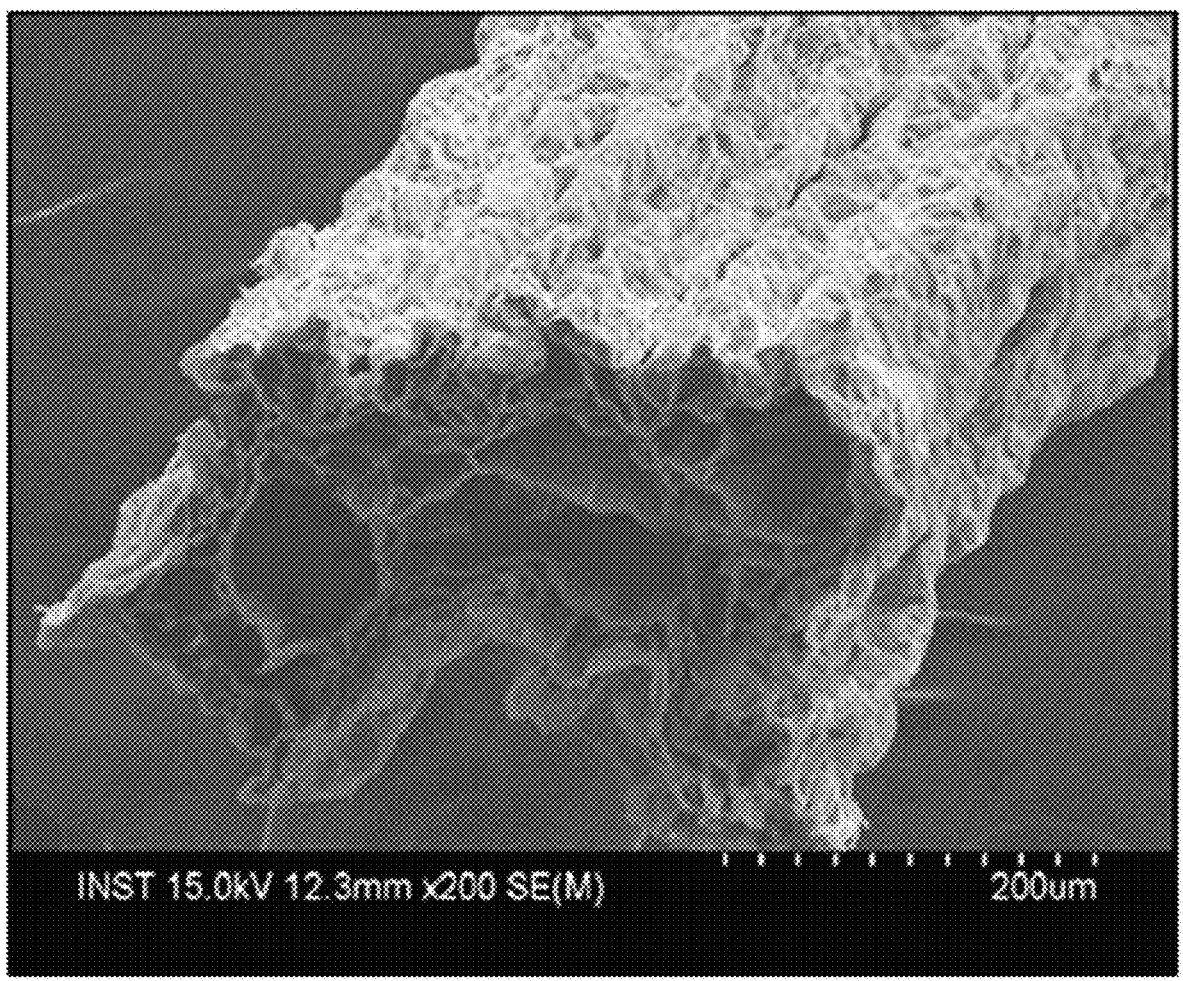

[Fig. 15]
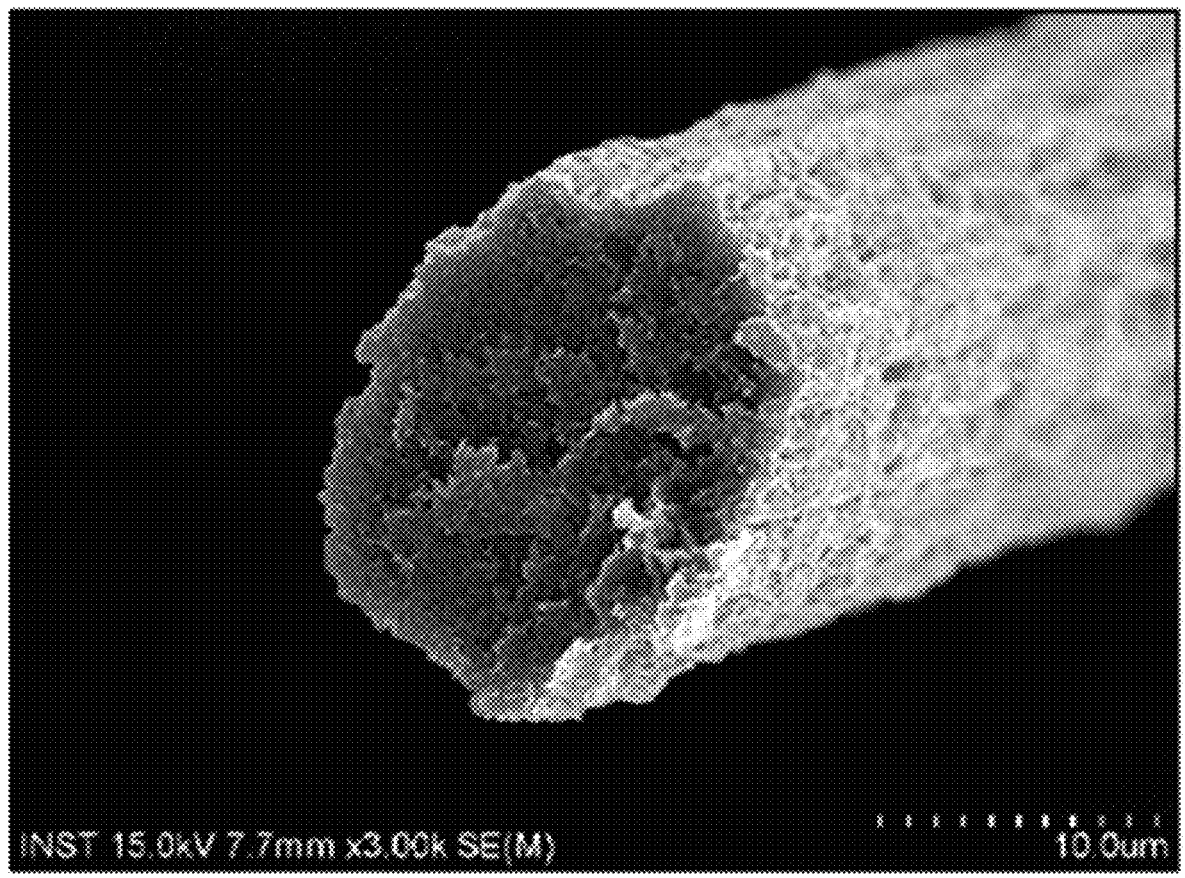

[Fig. 16]
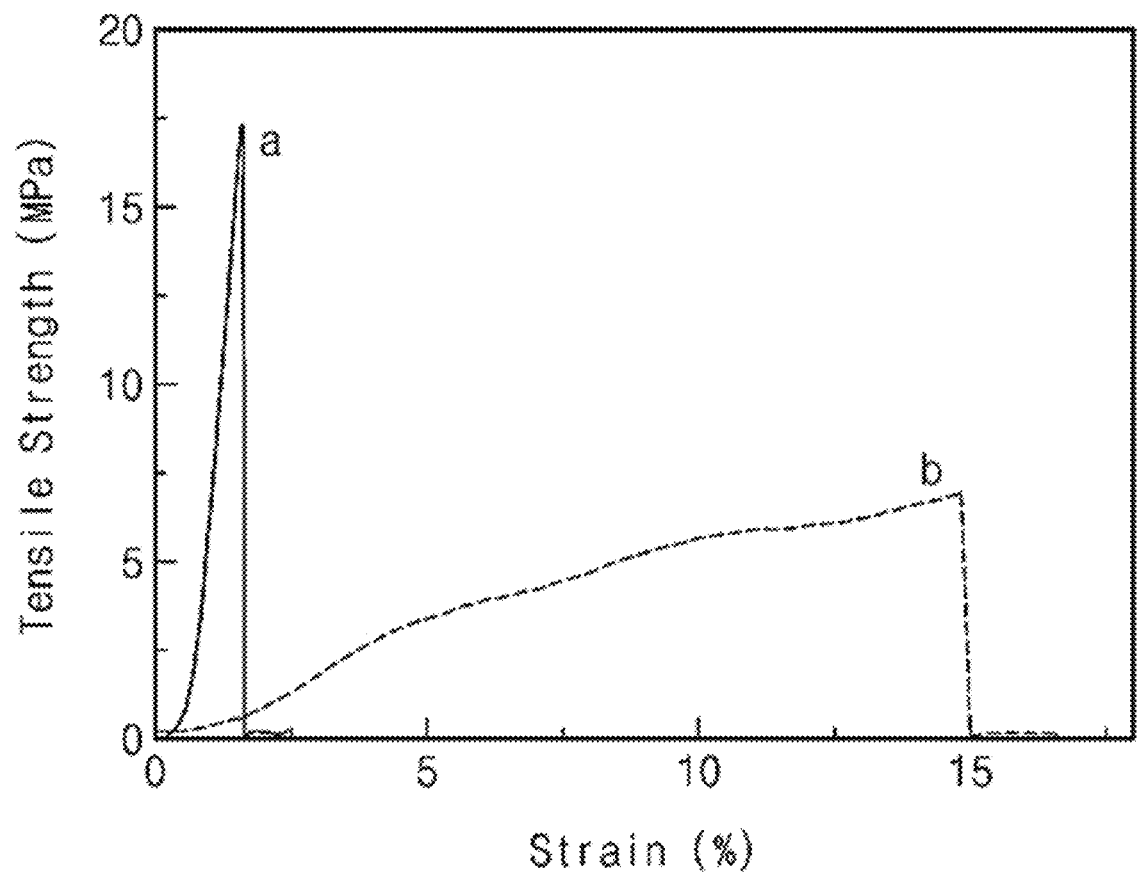

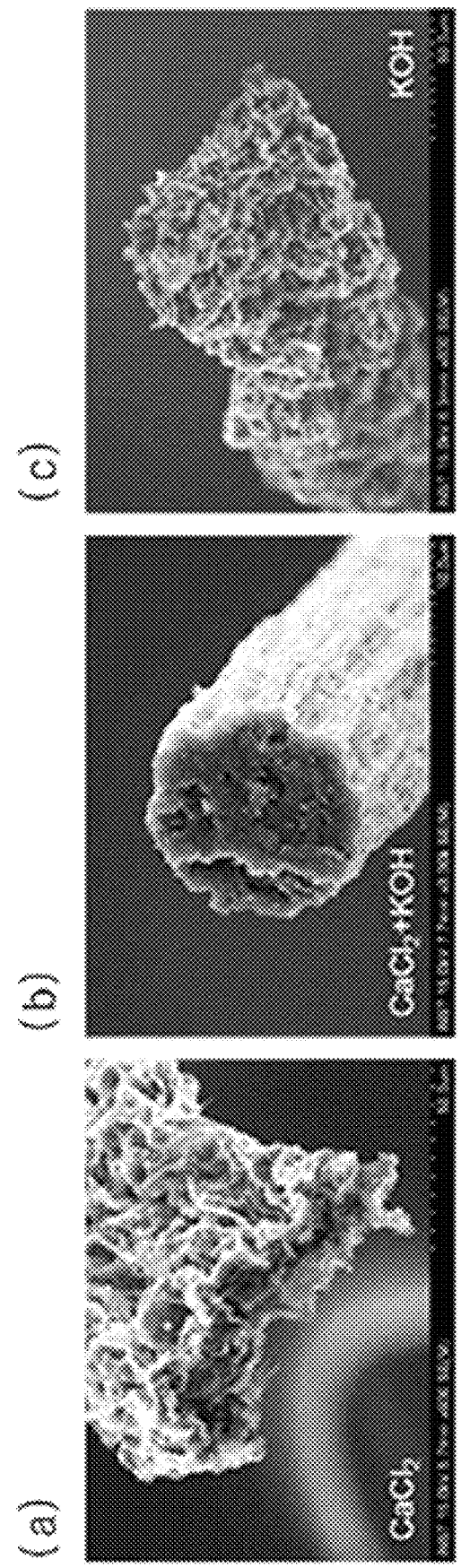
[Fig. 17]

[Fig. 18]
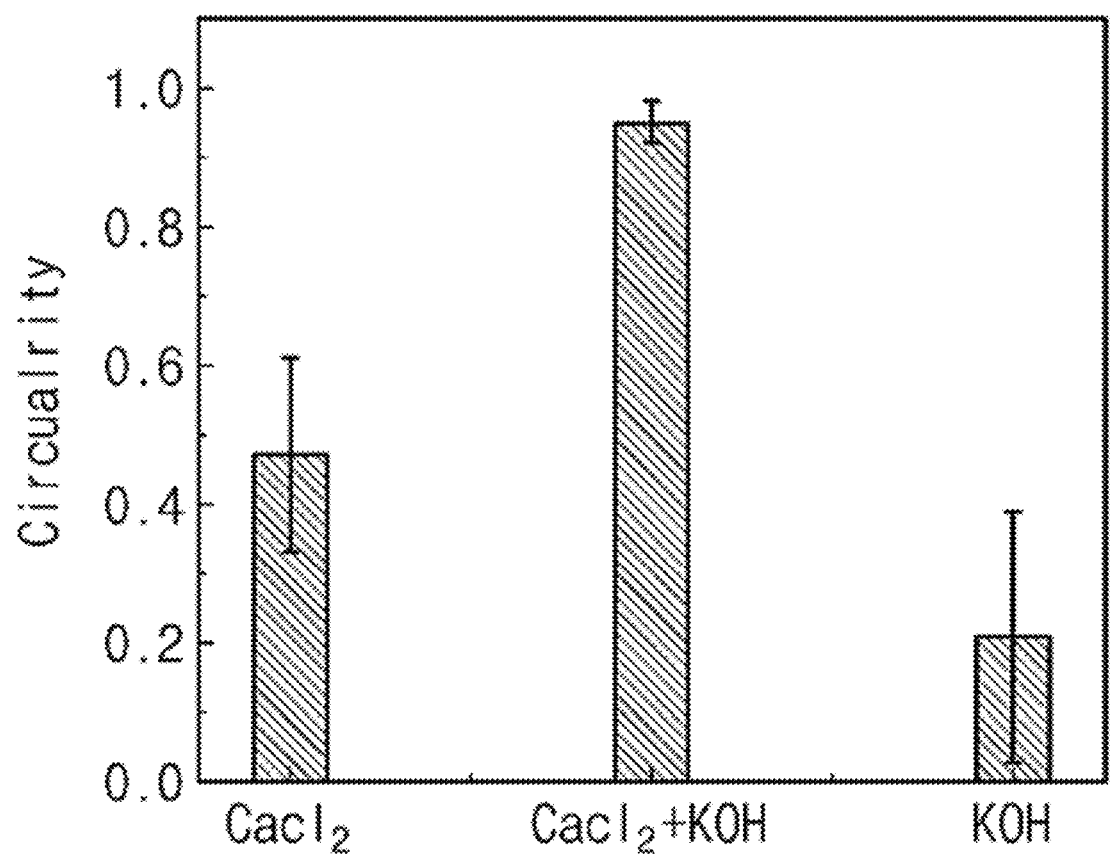

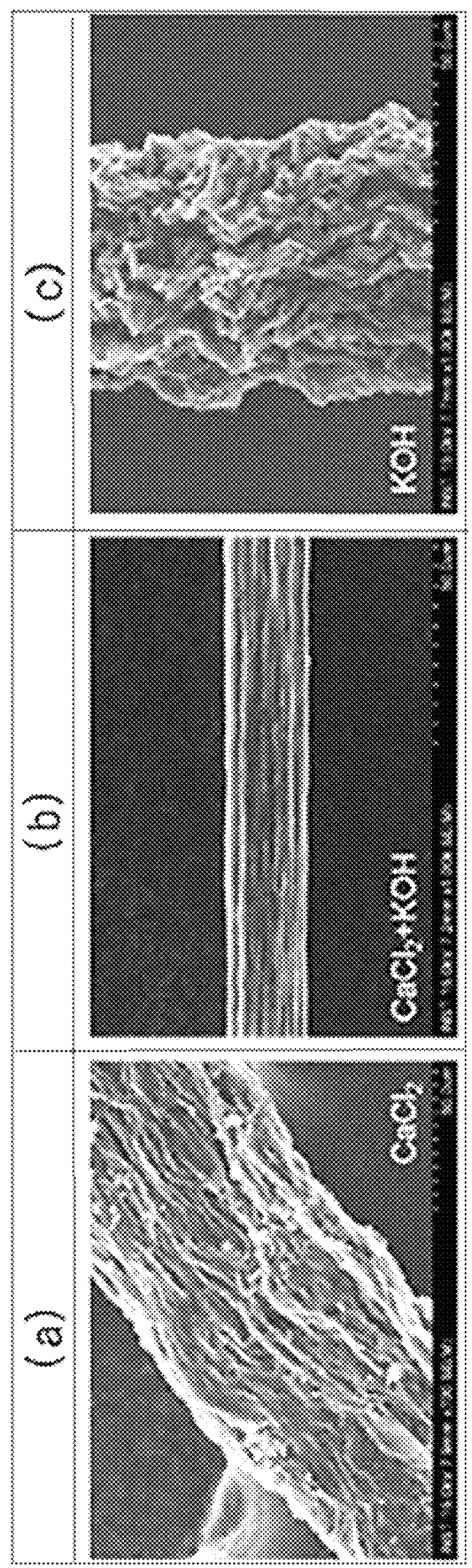
[Fig. 19]

[Fig. 20]
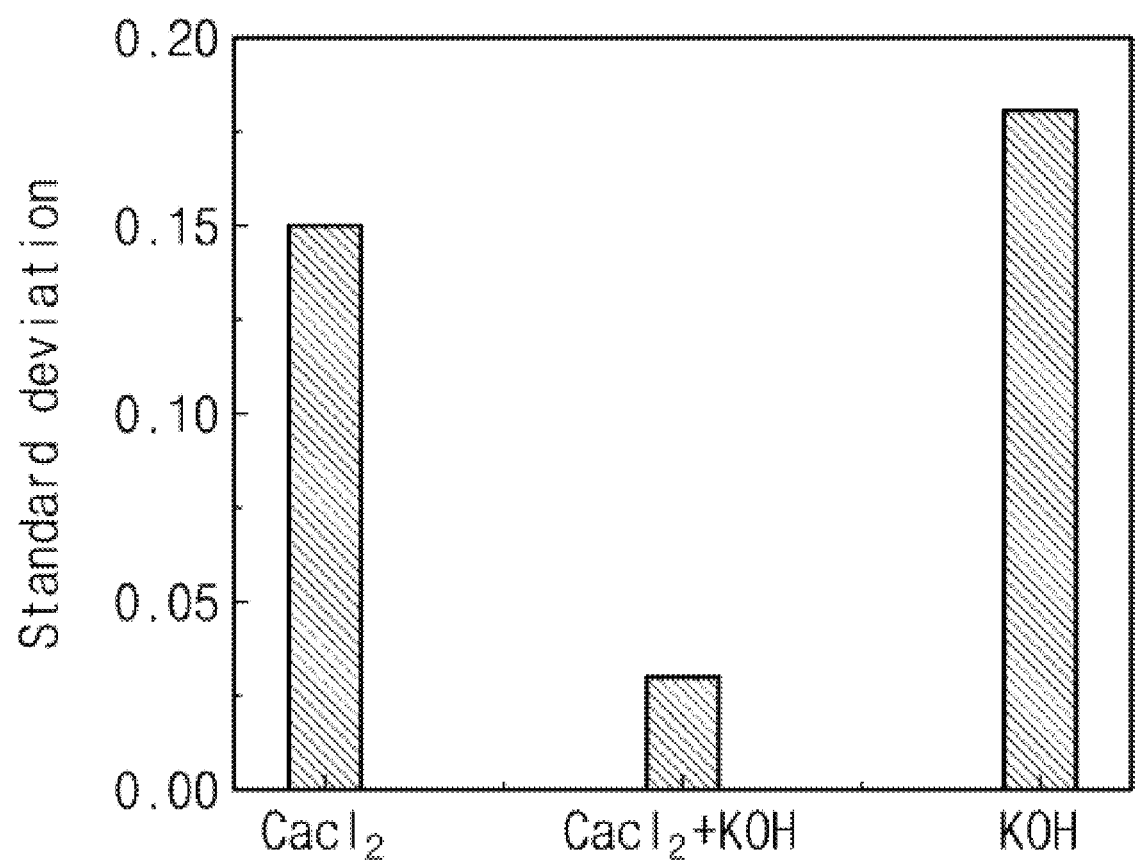

[Fig. 21]
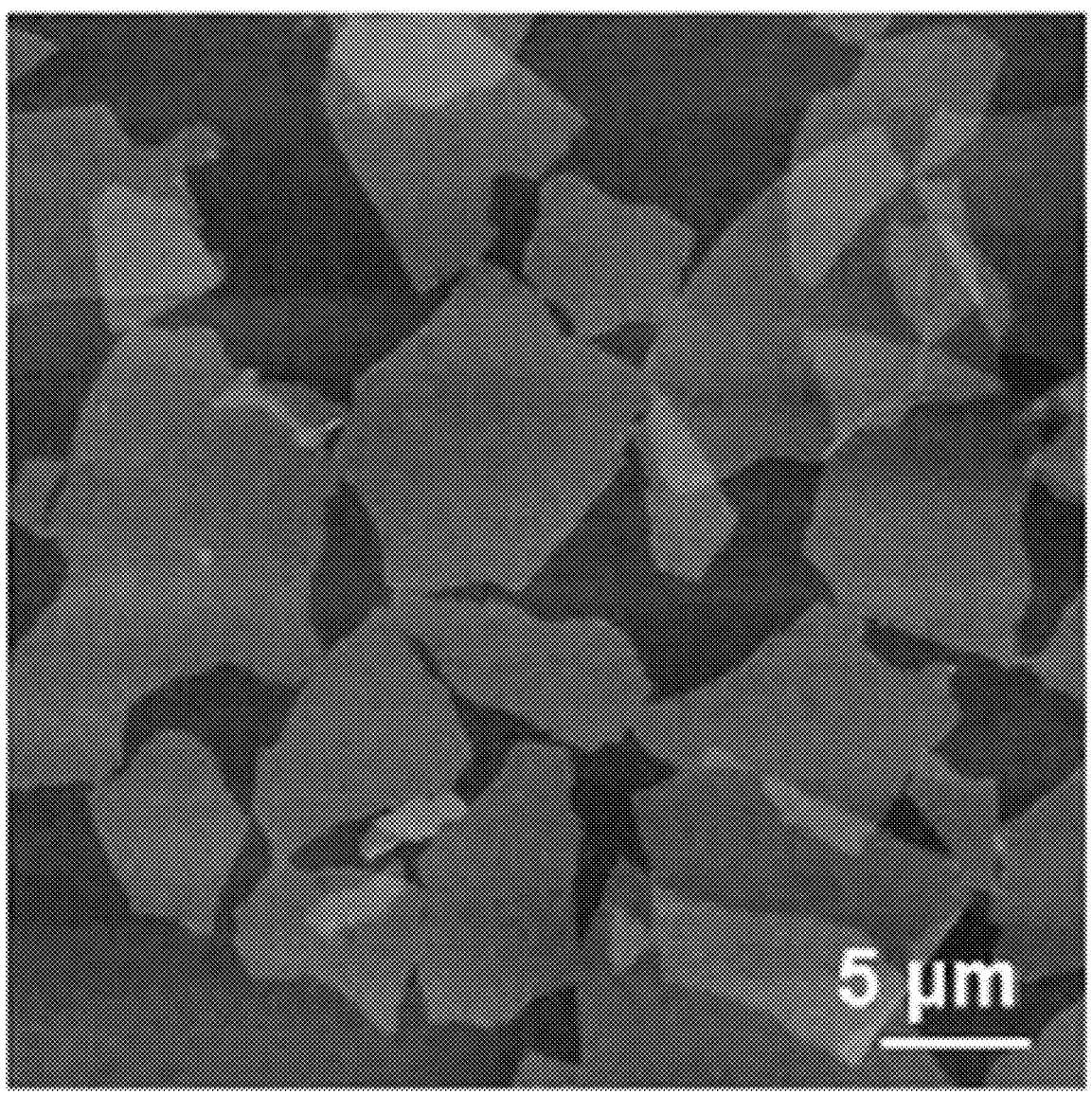

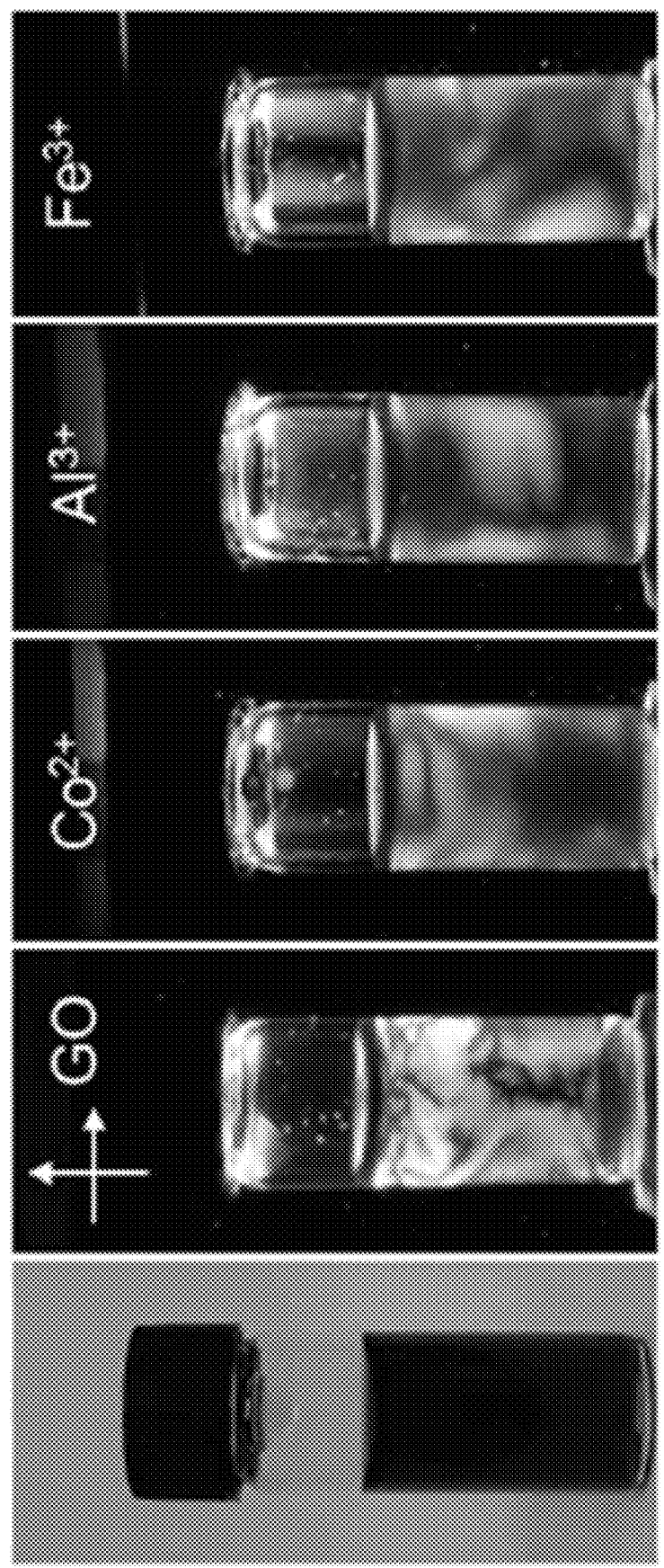
[Fig. 22]

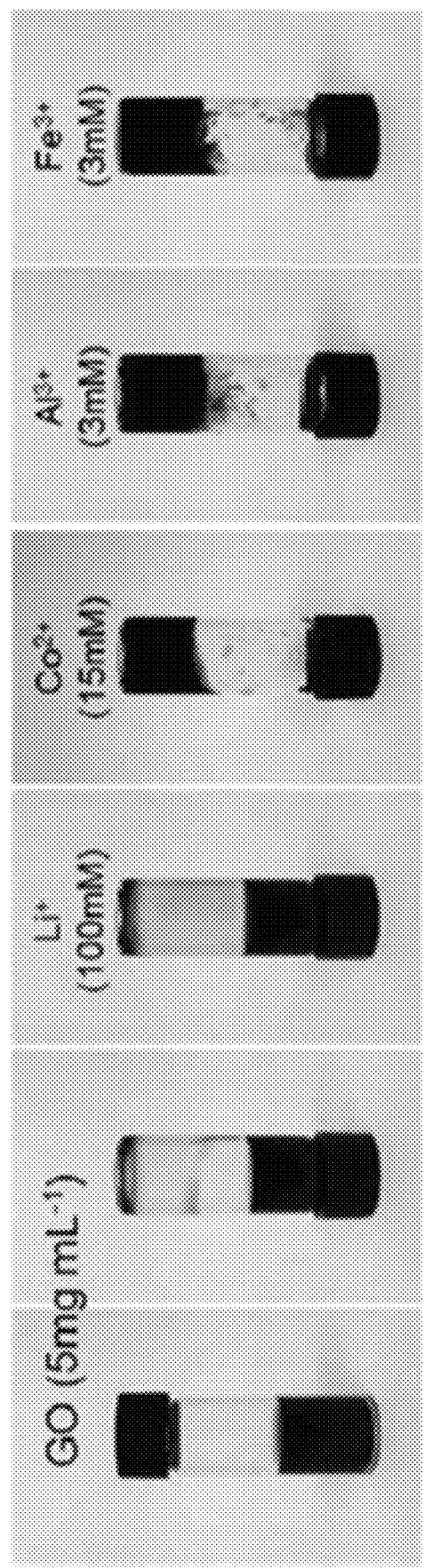
[Fig. 23]

[Fig. 24]
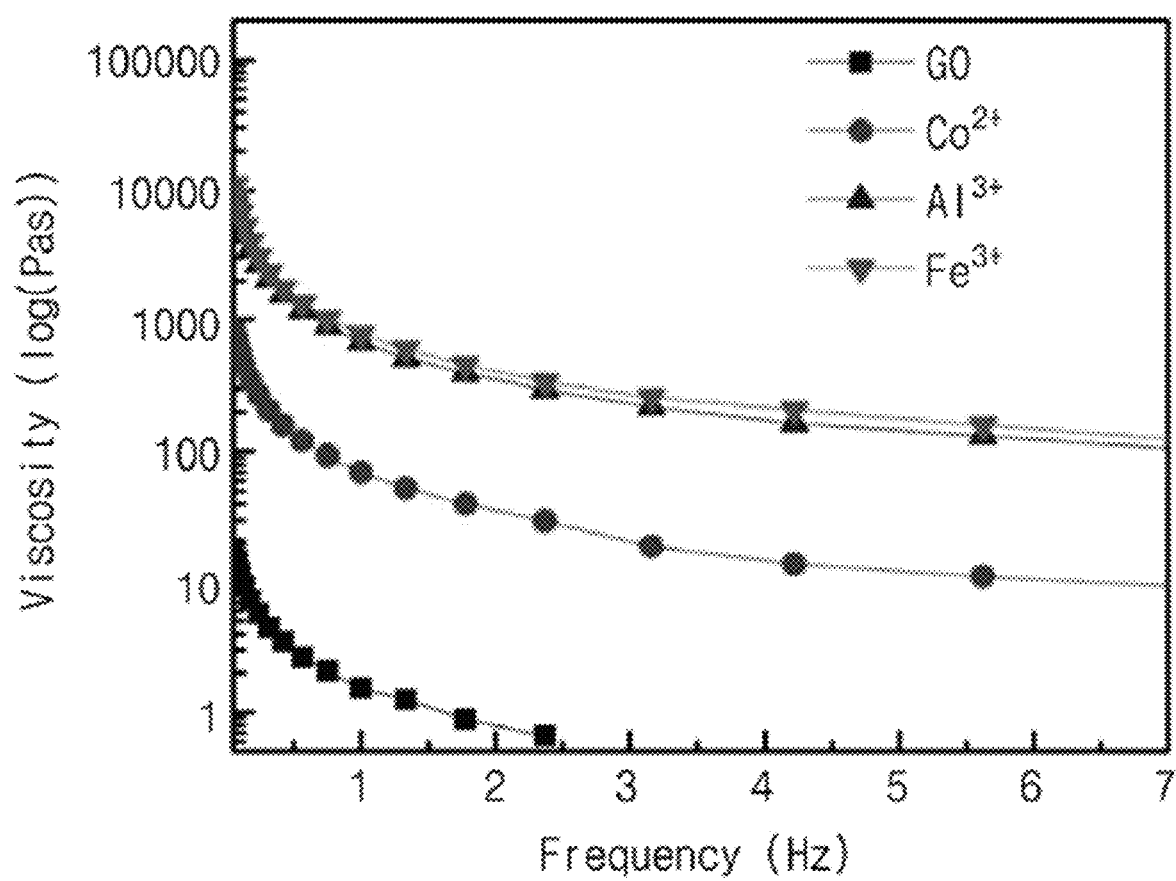

[Fig. 25]
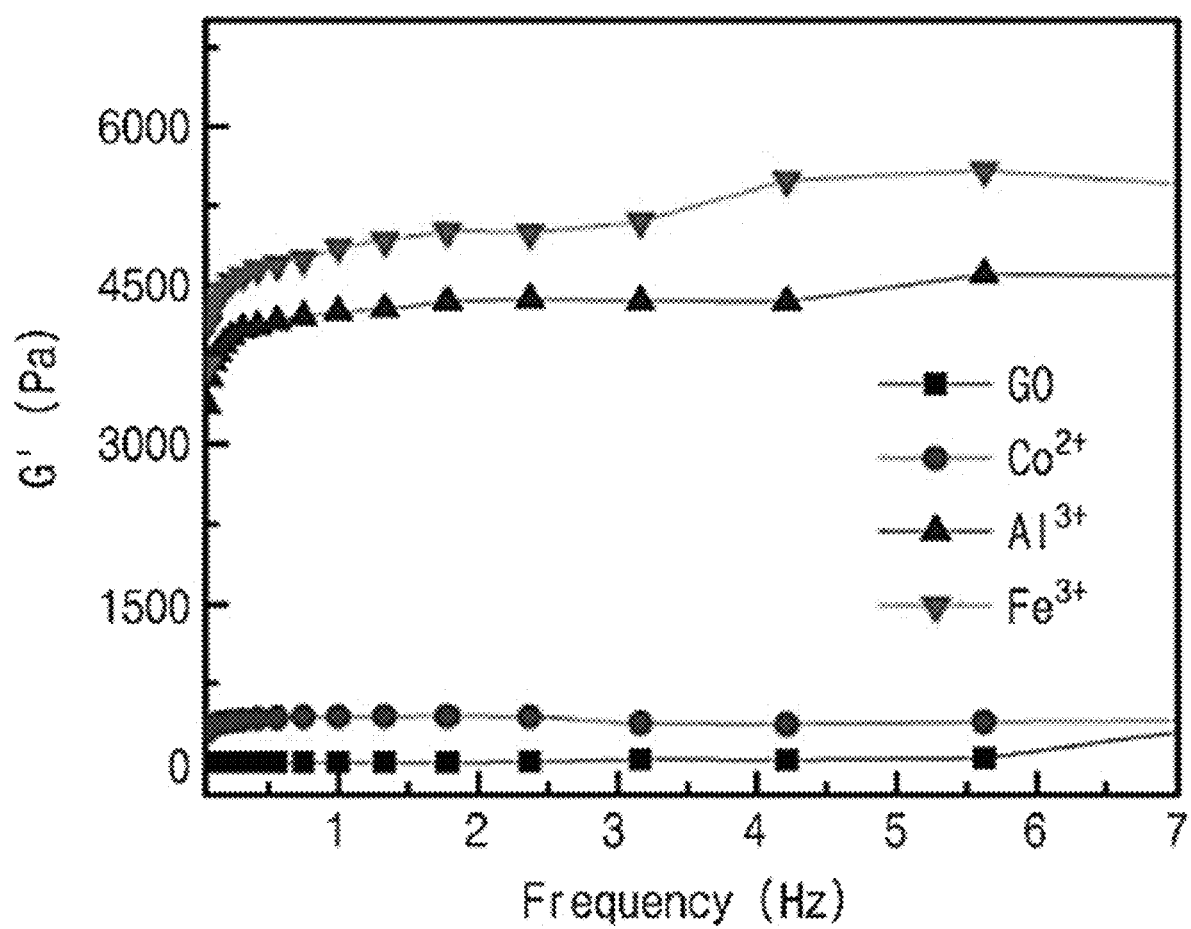

[Fig. 26]
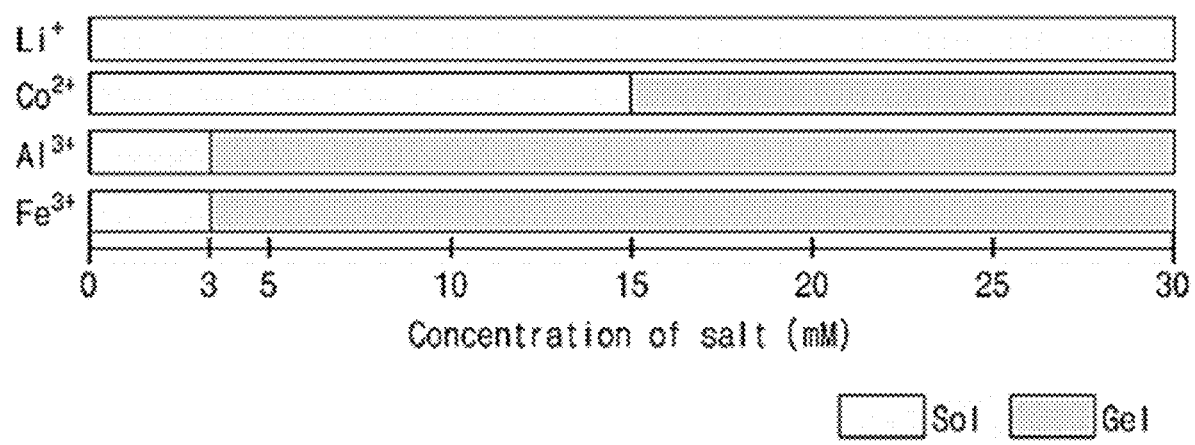

[Fig. 27]
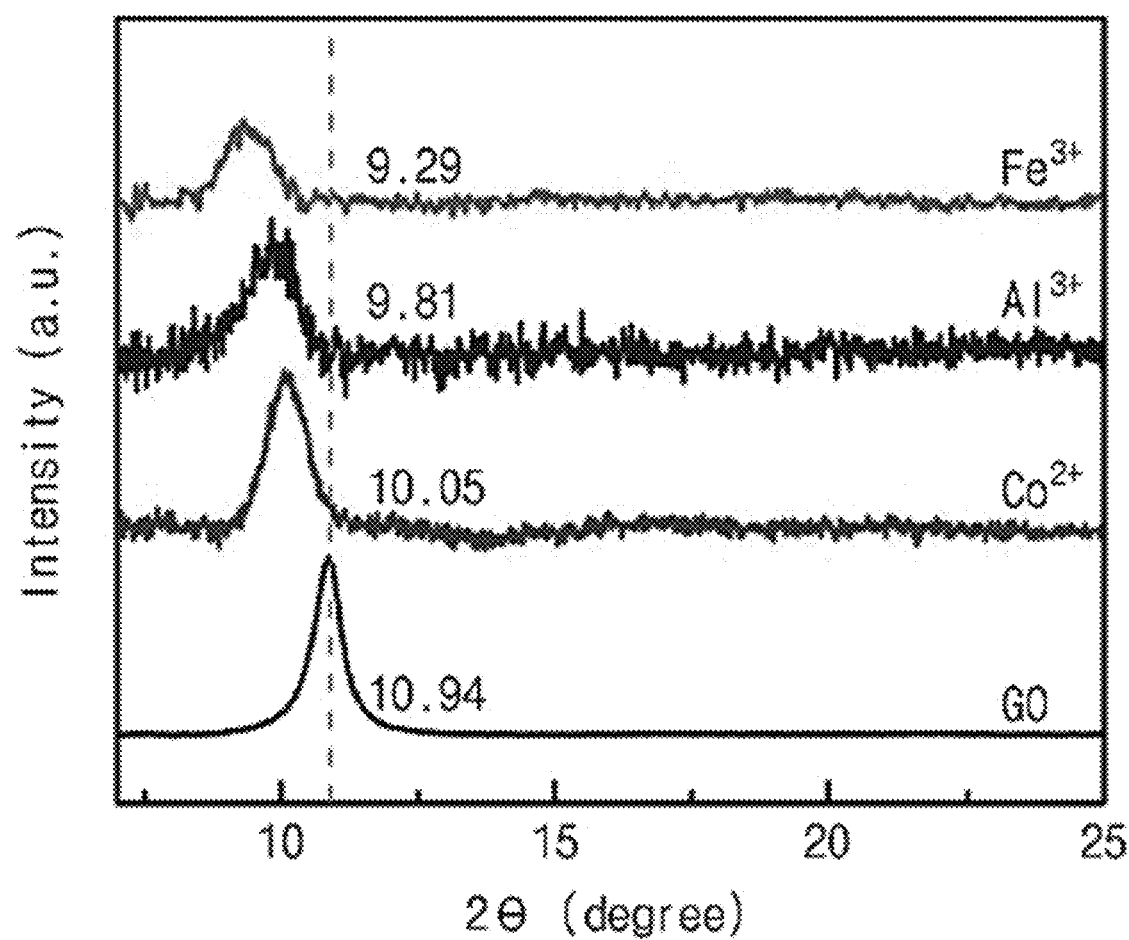

[Fig. 28]
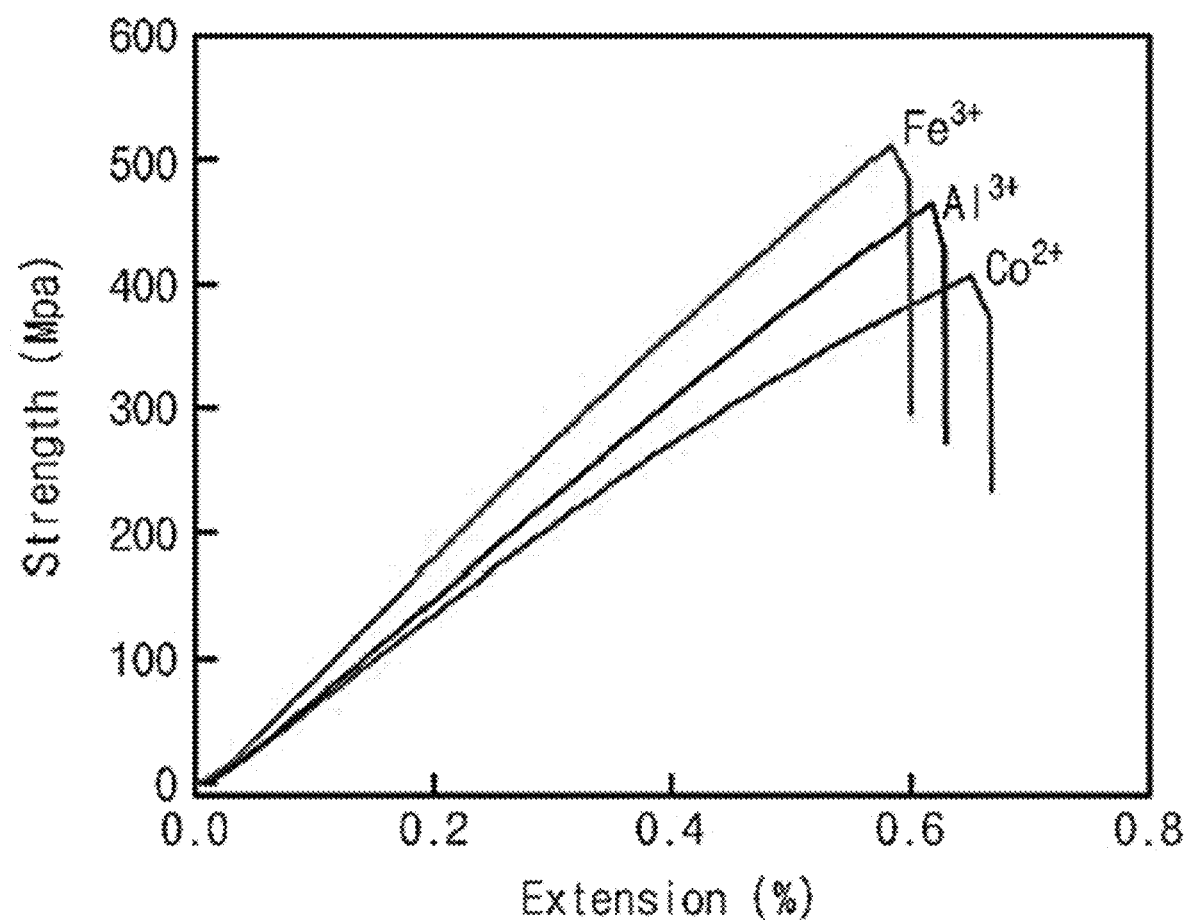

[Fig. 29]
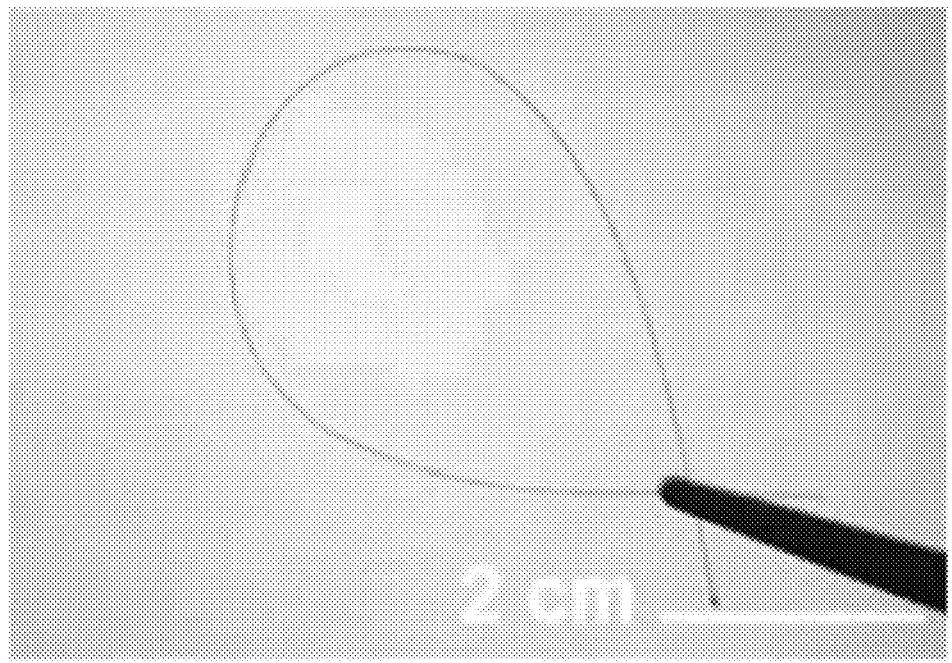
[Fig. 30]
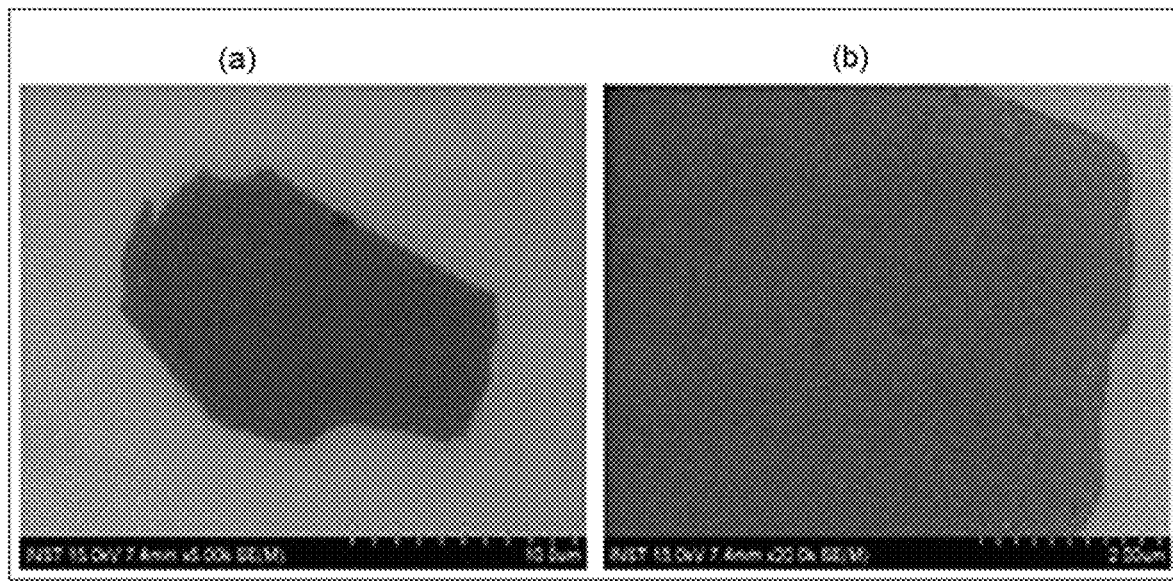

[Fig. 31]
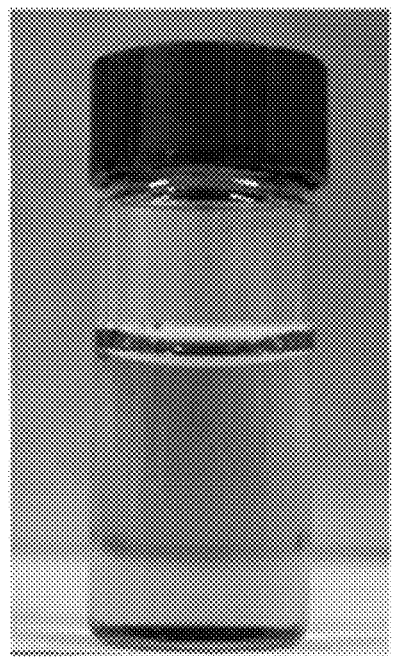
[Fig. 32]
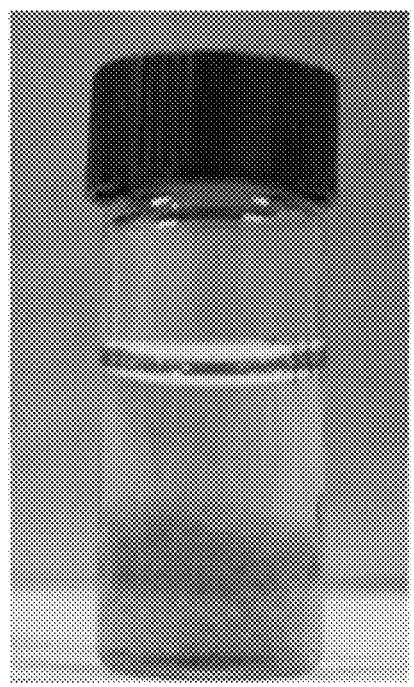

[Fig. 33]
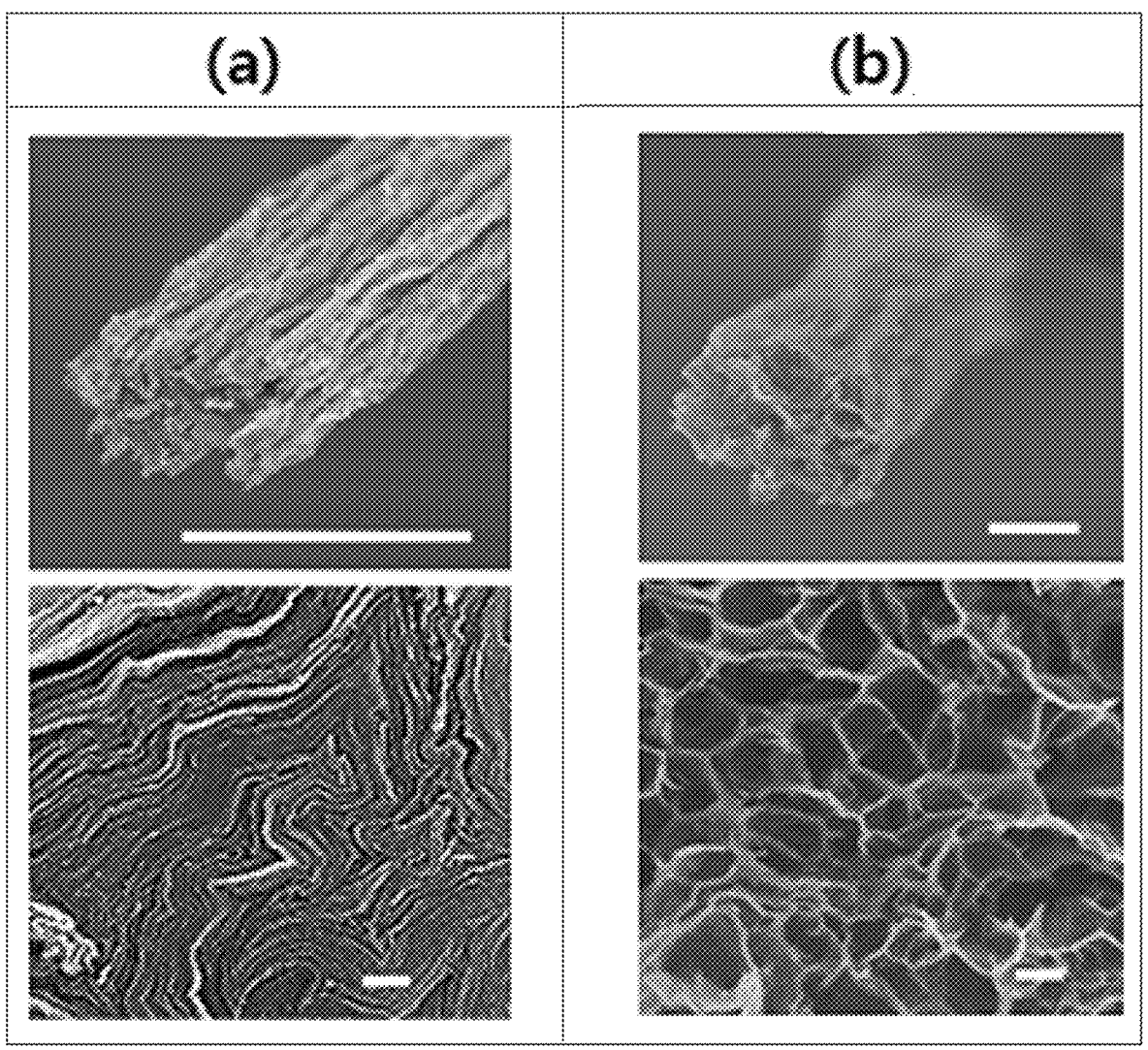

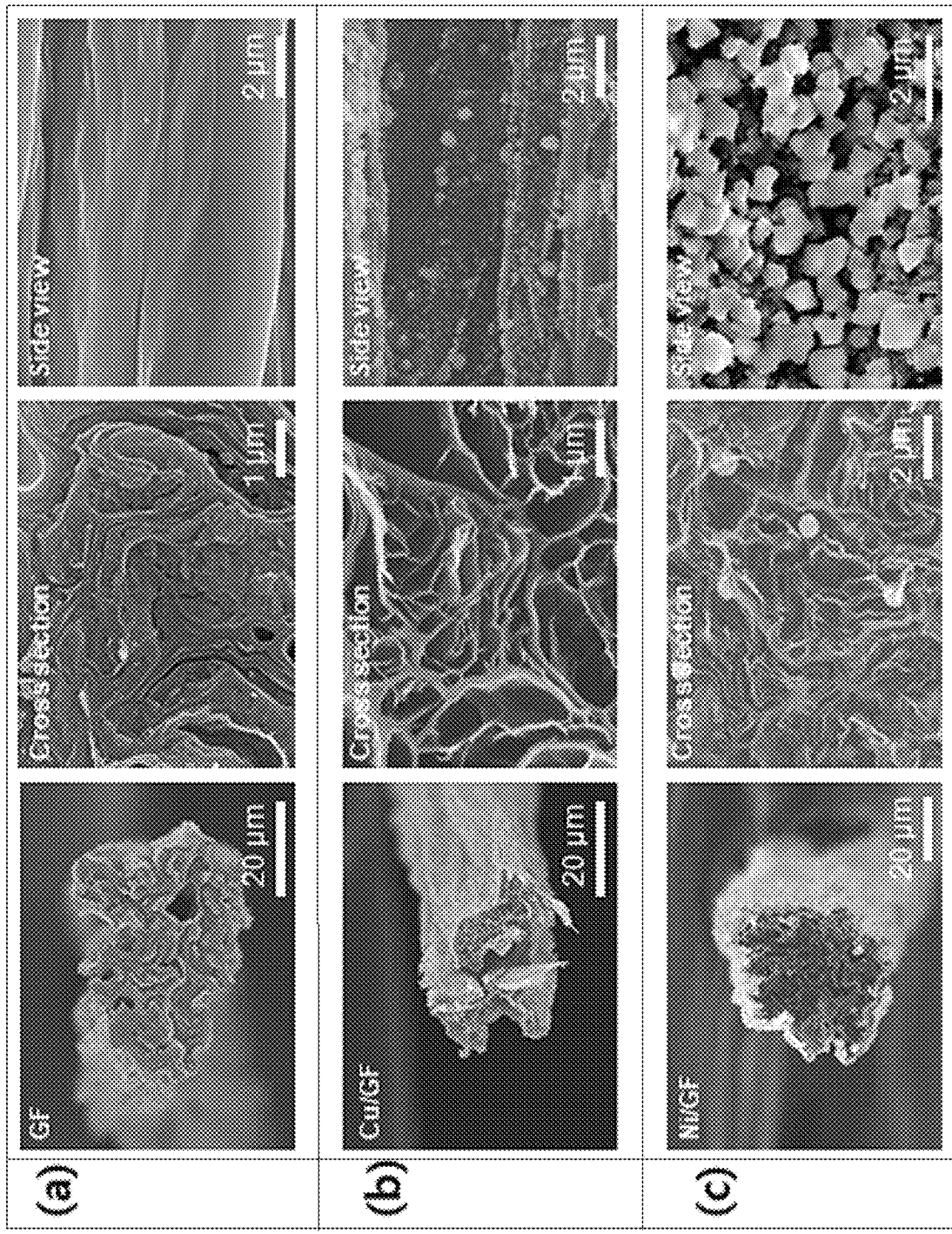
[Fig. 34]

[Fig. 35]
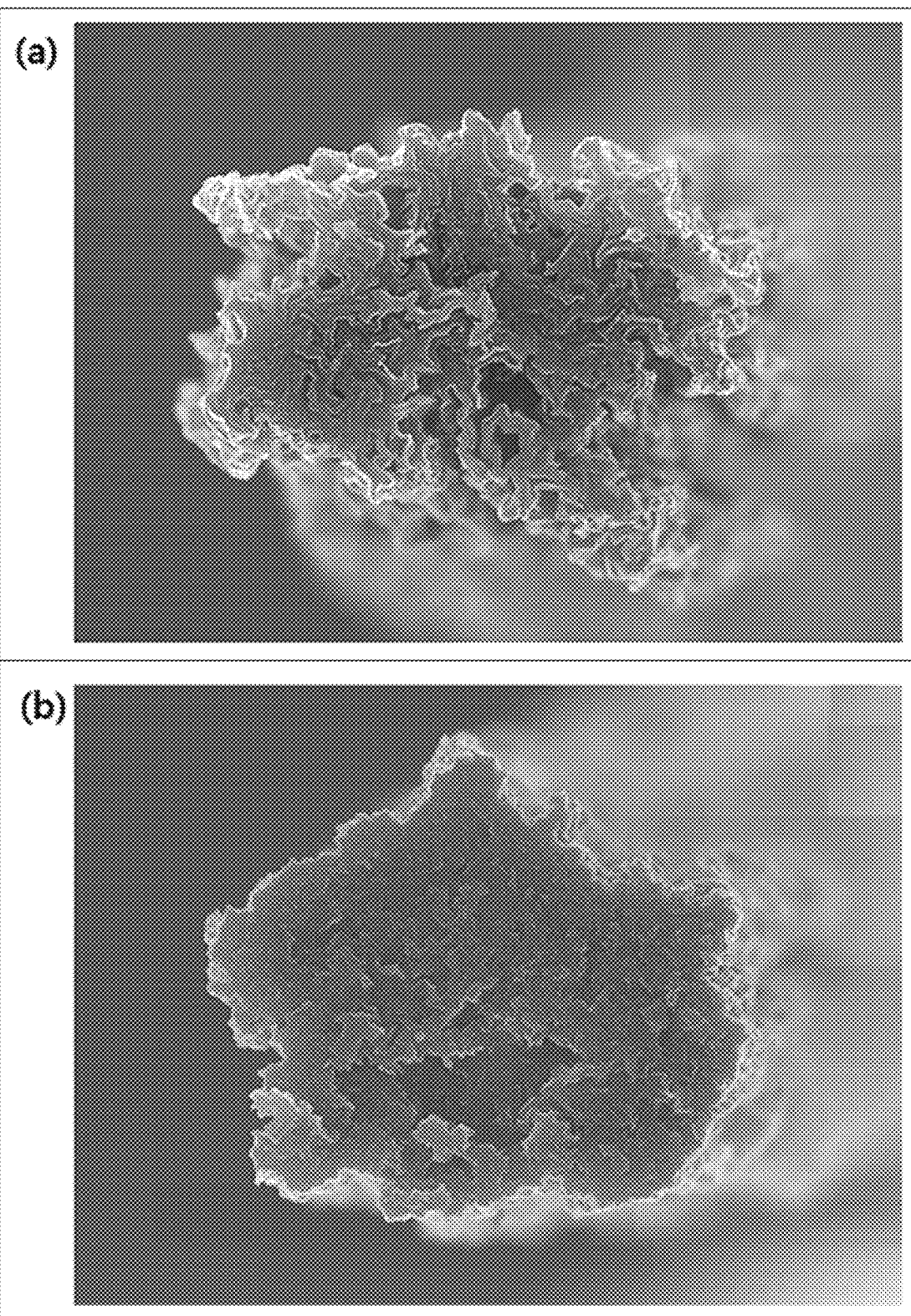

[Fig. 36]
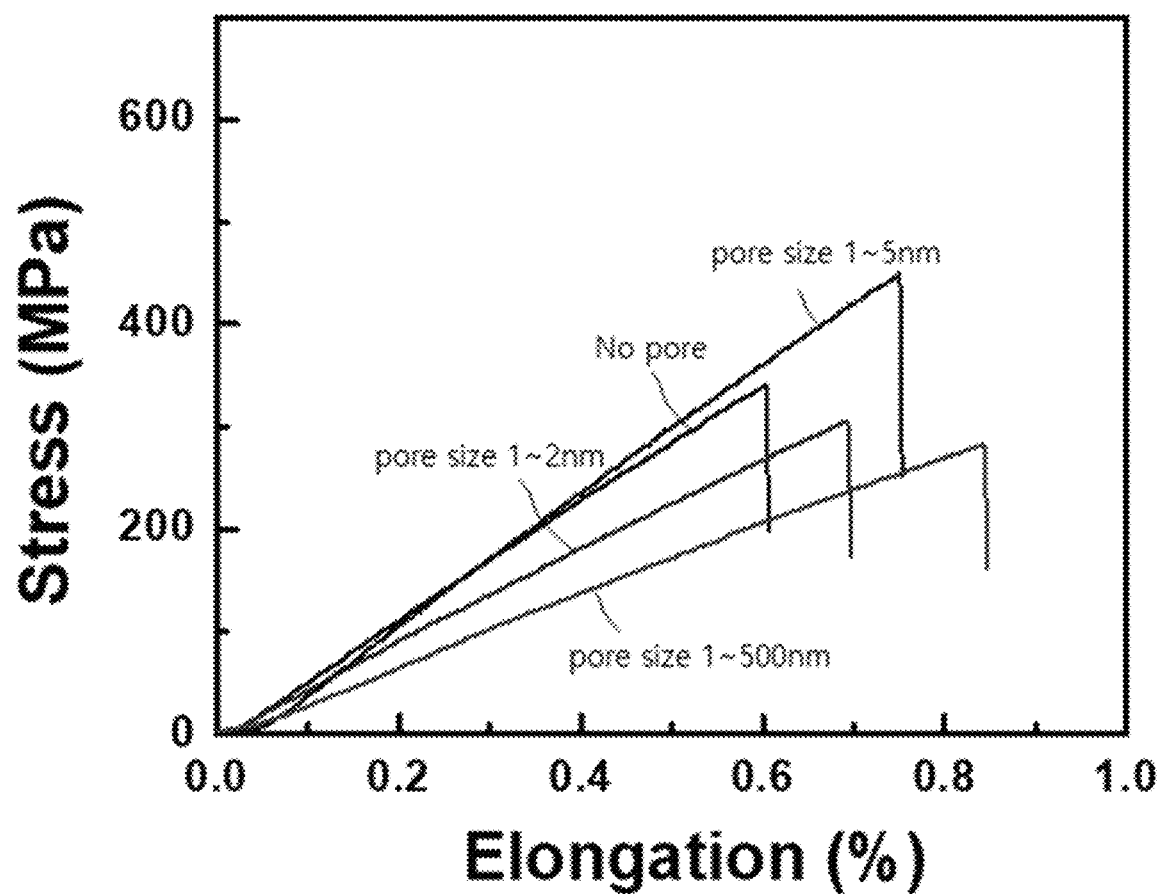

US 11,649,566 B2

GRAPHENE FIBER AND METHOD OF MANUFACTURING THE SAME

CROSS-REFERENCE TO RELATED APPLICATIONS

This application is a Continuation-in-Part of U.S. patent application Ser. No. 16/156,367, filed on Oct. 10, 2018 (allowed), which is a continuation of International Application No. PCT/KR2017/003930, filed on Apr. 11, 2017, which claims priority from Korean Patent Application 10-2016-0044225, filed on Apr. 11, 2016, Korean Patent Application 10-2016-0044228, filed on Apr. 11, 2016, Korean Patent Application 10-2016-0105541, filed on Aug. 19, 2016, and Korean Patent Application 10-2017-0013852, filed on Jan. 31, 2017, the disclosures of which are incorporated herein by reference in its entireties.

BACKGROUND

1. Field

The inventive concept relates to a graphene fiber and a method of manufacturing the same, and more particularly, to a method of manufacturing a source solution which includes a graphene oxide with pores formed by adding a graphene oxide, an oxidizing agent and a pH adjusting agent into a solvent, and a method of manufacturing a porous structured graphene fiber capable of adjusting elongation percentage by controlling concentration and supply rate (spinning rate) of the source solution.

2. Description of the Related Art

Graphene is a material which has various properties such as excellent strength, excellent thermal conductivity, and excellent electron mobility. Thus, the graphene has been recognized as a core material capable of leading the growth of various fields such as displays, secondary batteries, solar cells, automobiles and lighting, and techniques for commercializing the graphene have been studied.

Recently, processes for manufacturing a graphene oxide using graphite material have been actively studied to provide useful mechanical and electrical properties of graphene with various industry fields.

For example, Korean Patent Publication No. KR2014004585A (Application No. KR20120112103A, Applicant: Grapheneall Co. Ltd.) discloses a method of manufacturing a graphene oxide capable of separating an acid from a product of the graphene oxide in relatively short time and reducing waste matter of toxic process byproduct such as an acid, which includes oxidizing a graphite using an acid to form a first reaction product including a graphene oxide; recovering the acid from the first reaction product; and oxidizing the graphite using the recovered acid to form a recycle reaction resultant including a graphene oxide To commercialize graphene in various industrial fields, it is required to study techniques of fabricating graphene, which are capable of reducing a process cost and a process time by simplified processes and of performing a subsequent process of the graphene to control properties of the graphene according to an applied field.

SUMMARY

Embodiments of the inventive concepts may provide a graphene fiber having superior elongation percentage and a method of manufacturing the same.

Embodiments of the inventive concepts may also provide a graphene fiber having superior mechanical characteristics and a method for manufacturing the same.

Embodiments of the inventive concepts may also provide a graphene fiber having flexibility and a method of manufacturing the same.

Embodiments of the inventive concepts may also provide a graphene fiber having high electric conductivity and a method of manufacturing the same.

Embodiments of the inventive concepts may also provide a graphene fiber having porous structure and a method of manufacturing the same.

Embodiments of the inventive concepts may also provide a graphene fiber capable of reducing process cost and process time and a method of manufacturing the same.

Embodiments of the inventive concepts may also provide a graphene fiber capable of mass production and a method of manufacturing the same.

Embodiments of the inventive concepts may also provide a graphene fiber having high circularity and a method of manufacturing the same.

Embodiments of the inventive concepts may also provide a highly oriented graphene fiber and a method of manufacturing the same.

Embodiments of the inventive concepts may also provide a graphene fiber capable of post process and a method of manufacturing the same.

Embodiments of the inventive concepts may also provide a graphene fiber having high electric conductivity and a method of manufacturing the same.

In an aspect, a method of manufacturing a graphene fiber may include preparing a source solution including graphene oxide, supplying the source solution into a base solution containing a foreign element to form a graphene oxide fiber, separating the graphene fiber from the base solution and cleaning and drying to obtain the graphene oxide fiber containing the foreign element, and performing thermal treatment to the dried graphene oxide fiber containing the foreign element to form a graphene fiber doped with the foreign element. Elongation percentage of the graphene fiber may be adjusted by concentration and spinning rate of the source solution.

In an embodiment, the elongation percentage of the graphene fiber may increase as increasing the concentration of the graphene oxide in the source solution.

In an embodiment, the elongation percentage of the graphene fiber may increase as decreasing the spinning rate of the source solution.

In an embodiment, the obtaining of the graphene oxide fiber containing the foreign element may further include drying the graphene oxide fiber simultaneously with winding.

In an embodiment, the elongation percentage of the graphene fiber may increase when a spinning rate of the source solution is higher than a winding rate of the graphene oxide containing the foreign element.

In an embodiment, the forming of the graphene fiber may include reducing the graphene oxide fiber into the graphene fiber through the thermal treatment simultaneously with doping the graphene fiber with the foreign element in the graphene oxide fiber.

In another aspect, a method of manufacturing a graphene fiber may include preparing a source solution including graphene oxide sheet, supplying the source solution into a coagulation bath which includes a reducing agent partially reducing the graphene oxide sheet and a binder binding the graphene oxide sheets to obtain the graphene oxide binder, and reducing the graphene oxide fiber to form a graphene fiber.

In an embodiment, the graphene oxide sheet may be partially reduced by the reducing agent to form a partially reduced graphene oxide, and π-π stacking in the partially reduced graphene oxide sheets may increase to increase tensile strength of the graphene oxide fiber.

In an embodiment, the binder may include a divalent or trivalent metallic ion.

In an embodiment, the method of the graphene fiber may further include plating the graphene fiber with copper to form a copper plated graphene fiber.

In an embodiment, the forming of the copper plated graphene fiber may include etching the graphene fiber, combining a catalyst metal with the graphene fiber, and soaking the graphene fiber combined with the catalyst metal into a solution containing copper to plate the graphene fiber with copper using the method of reducing the copper by the catalyst metal.

In an embodiment, the copper plated graphene fiber may include pores provided between the graphene sheets which are reduced graphene oxide sheets, or a copper structure provided on a surface of the graphene fiber.

In an embodiment, the forming of the graphene fiber may include drying the graphene oxide fiber, cleaning and drying the dried graphene oxide fiber, and soaking the cleaned and dried graphene oxide fiber into a reducing solution and performing thermal treatment to reduce the graphene oxide fiber.

In an embodiment, the source solution may further include a carbon nanotube, and the graphene fiber may further include the carbon nanotube.

In still another aspect, a method of manufacturing a graphene fiber may include reacting a graphene oxide, oxidizing agent and pH adjusting agent after adding into a solvent to prepare a source solution in which a graphene oxide with pores, supplying the source solution into a base solution containing a foreign element to form a source oxide fiber, cleaning and drying the graphene oxide fiber after separating from the base solution to obtain a graphene oxide fiber containing the foreign element, performing thermal treatment to the dried graphene oxide fiber containing the foreign element to form a graphene fiber doped with the foreign element, and reacting the graphene fiber with an aqueous solution containing a first oxidizing agent to form micro pores in the graphene fiber.

In an embodiment, porosity of the graphene oxide may increase as increasing content of the oxidizing agent in the source solution.

In an embodiment, porosity of the graphene oxide may increase as increasing pH of the source solution.

In an embodiment, porosity of the micro pores which is formed in the graphene fiber may be adjusted by content of the first oxidizing agent in the aqueous solution, and time and temperature of the reaction.

In an embodiment, porosity in the graphene oxide in the source solution may be adjusted by the oxidizing agent in the source solution, pH of the source solution and reaction temperature.

In an embodiment, the forming of the graphene fiber may include reducing the graphene oxide fiber into the graphene fiber through the thermal treatment simultaneously with doping the graphene fiber with the foreign element in the graphene oxide fiber, and electric conductivity of the graphene fiber is adjusted by content of the foreign element doped to the graphene fiber In order to solve the above technical problem, an aspect of the present disclosure provides a graphene fiber composite.

In an aspect, the graphene fiber composite includes graphene fibers in which a plurality of graphene sheets is aggregated to extend in one direction, wherein according to a degree of orientation of the plurality of graphene sheets, the porosity of the graphene fibers and the elongation percentage of the graphene fibers may be adjusted.

In an embodiment, the degree of orientation of the plurality of the graphene sheets is defined as higher as the difference between the extension direction of the graphene fibers and an arrangement direction of the plurality of the graphene sheets decreases, as the orientation degree of the plurality of the graphene sheets increases the porosity of the graphene fibers decreases and the elongation percentage of the graphene fibers decreases, as the orientation degree of the plurality of the graphene sheets decreases the porosity of the graphene fibers increases and the elongation percentage of the graphene fibers increases.

In an embodiment, a pore is provided between the plurality of the graphene sheets inside the graphene fiber, and the graphene fiber composite may further include a copper structure attached to the surface of the graphene fiber and inside of the pore.

In an embodiment, the plurality of graphene sheets includes a first graphene sheet having a pore therein, and a second graphene sheet having no pore therein, and according to the ratio of the first graphene sheet to the second graphene sheet, the ratio of pore in a cross section of the graphene fiber may be adjusted.

In an embodiment, as the ratio of the first graphene sheet to the second graphene sheet increases, the ratio of pore in the cross-section of the graphene fiber may decrease.

In an embodiment, the plurality of the graphene sheets may have pores therein, and the size of the pores of the graphene sheet may be 1 to 500 nm.

In an embodiment, a circularity of the graphene fiber is 0.8 or more, and the circularity of the graphene fiber may be calculated as shown in Equation 1 below.

$$\text{Circularity} = 4\pi A/(P^2) \qquad \text{<Equation 1>}$$

(In Equation 1, A: Sectional Area, P: Circumference of cross section)

In an embodiment, the graphene fiber composite may further include carbon nanotubes provided between the plurality of the graphene sheets.

In an embodiment, the graphene sheet may be doped with foreign element.

In an embodiment, according to a doping amount of the foreign element doped on the graphene sheet, the ratio of pores in the cross section of the graphene fiber may be adjusted.

In an embodiment, as the doping amount of the foreign element doped on the graphene sheet increases, the ratio of pores in the cross section of the graphene fiber may increase.

In an embodiment, the foreign element may include at least one of nitrogen, sulfur, fluorine, or iodine.

In an embodiment, according to a doping amount of the foreign element doped on the graphene sheet, the electrical conductivity of the graphene fiber may be adjusted.

According to another aspect, the present disclosure provides a wire structure.

In an embodiment, the wire structure may include the graphene fiber composite according to the above-described embodiments, and an insulator covering the graphene fiber composite.

BRIEF DESCRIPTION OF THE DRAWINGS

FIG. 1 is a flowchart illustrating a method of manufacturing a graphene fiber according to the first embodiment of the inventive concepts.

FIG. 2 is a view illustrating a method of manufacturing a graphene fiber according to the first embodiment of the inventive concepts.

FIG. 3 is a view illustrating degree of orientation and elongation percentage of a graphene fiber according to the first embodiment of the inventive concepts.

FIG. 4 is a flowchart illustrating a method of manufacturing a graphene fiber according to the second embodiment of the inventive concepts.

FIG. 5 is a perspective view illustrating a function of a binder in a coagulation bath which is used for a method of manufacturing a graphene fiber according to an embodiment of the inventive concepts.

FIGS. 6A and 6B are views illustrating a copper plated graphene fiber manufactured by a method of manufacturing a graphene fiber according to the first modification of the second embodiment of the inventive concepts.

FIG. 7 is a flowchart illustrating a method of manufacturing source solution for manufacturing a graphene fiber according to the third embodiment of the inventive concepts.

FIG. 8 is a view illustrating a method of manufacturing source solution for manufacturing a graphene fiber according to the third embodiment of the inventive concepts.

FIG. 9 is a view enlarging A of FIG. 8 and illustrating a graphene oxide with pores according to the third embodiment of the inventive concepts.

FIG. 10 is a view enlarging B of FIG. 9 and illustrating specific structure of a graphene oxide with pores according to the third embodiment of the inventive concepts.

FIG. 11 is a flowchart illustrating a method of manufacturing a graphene fiber according to the third embodiment of the inventive concepts.

FIG. 12 illustrates a process in which a source solution is supplied through a spinneret to form a graphene oxide fiber according to the first embodiment of the inventive concepts.

FIG. 13 illustrates a process in which a graphene oxide fiber containing a foreign element is wound by a winding roller according to the first embodiment of the inventive concepts.

FIG. 14 is an image of a graphene fiber with low degree of orientation according to the first embodiment of the inventive concepts.

FIG. 15 is an image of a graphene fiber with high degree of orientation according to the first embodiment of the inventive concepts.

FIG. 16 is a graph illustrating tensile strength value by increasing external strain of a graphene fiber according to an embodiment of the inventive concepts.

FIG. 17 illustrates images of graphene fibers according to the second embodiment 1 of the inventive concepts, the first comparative example and a second comparative example.

FIG. 18 is a graph showing circularity of graphene fibers according to the second embodiment 1 of the inventive concepts, the first comparative example and a second comparative example.

FIG. 19 illustrates images of graphene fiber surfaces according to the second embodiment 1 of the inventive concepts, the first comparative example and a second comparative example.

FIG. 20 is a graph showing standard deviation of thickness of graphene fibers according to the second embodiment 1 of the inventive concepts, the first comparative example and a second comparative example.

FIG. 21 is an AFM image of a graphene oxide sheet used for manufacturing a graphene oxide fiber according to the second embodiments 2 through 4 of the inventive concepts.

FIG. 22 illustrates images of source solution, source solution containing $CoCl_2$, $AlCl_3$ or $FeCl_3$ according to the second embodiments 2 through 4 of the inventive concepts.

FIG. 23 illustrates images of source solution and source solution containing $CoCl_2$, $AlCl_3$ or $FeCl_3$ according to the second embodiments 2 through 4 of the inventive concepts for measuring viscosity.

FIG. 24 is viscosity graph of source solution, source solution containing $CoCl_2$, $AlCl_3$ or $FeCl_3$ according to the second embodiments 2 through 4 of the inventive concepts.

FIG. 25 is a storage modulus graph of source solution, source solution containing $CoCl_2$, $AlCl_3$ or $FeCl_3$ according to the second embodiments 2 through 4 of the inventive concepts.

FIG. 26 is a gelation degree graph of source solution, source solution containing $CoCl_2$, $AlCl_3$ or $FeCl_3$ according to the second embodiments 2 through 4 of the inventive concepts.

FIG. 27 is an XRD graph of a graphene oxide fiber according to the second embodiments 2 through 4 of the inventive concepts.

FIG. 28 is a mechanical strength graph of a graphene oxide fiber according to the second embodiments 2 through 4 of the inventive concepts.

FIG. 29 is an image of a graphene oxide fiber according to the second embodiment 2 of the inventive concepts.

FIG. 30 is a SEM image of a graphene oxide fiber with pores according to the third embodiment of the inventive concepts.

FIG. 31 is an image of source solution according to the third embodiment of the inventive concepts.

FIG. 32 is an image of source solution according to comparative example of the third embodiment of the inventive concepts.

FIG. 33 is a SEM photograph of graphene fibers according to 4-1 embodiment and 4-2 embodiment of the present application.

FIG. 34 is a SEM photograph of graphene fibers according to 5-1 embodiment to 5-3 embodiment of the present application.

FIG. 35 is an SEM photograph of a cross section of graphene fibers according to 6-1 embodiment and 6-2 embodiment of the present application.

FIG. 36 is a graph measuring the mechanical strength of the graphene fiber according to the size of the pores of the graphene sheet contained in the graphene fiber according to an embodiment of the present application.

DETAILED DESCRIPTION OF THE EMBODIMENTS

Embodiments of the inventive concepts will now be described more fully hereinafter with reference to the accompanying drawings. It should be noted, however, that the inventive concepts are not limited to the following exemplary embodiments, and may be implemented in various forms. Accordingly, the embodiments are provided only to disclose the inventive concepts and let those skilled in the art know the category of the inventive concepts.

It will be understood that when an element such as a layer, region or substrate is referred to as being "on" another element, it can be directly on the other element or intervening elements may be present. In addition, in the drawings, the thicknesses of layers and regions are exaggerated for clarity.

It will be also understood that although the terms first, second, third, etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concepts explained and illustrated herein include their complementary counterparts. As used herein, the term "and/or" includes any and all combinations of one or more of the associated listed items.

As used herein, the singular terms "a", "an" and "the" are intended to include the plural forms as well, unless the context clearly indicates otherwise. It will be further understood that the terms "comprises", "comprising", "includes", "including", "have", "has" and/or "having" when used herein, specify the presence of stated features, integers, steps, operations, elements, and/or components, but do not preclude the presence or addition of one or more other features, integers, steps, operations, elements, components, and/or groups thereof. Furthermore, it will be understood that when an element is referred to as being "connected" or "coupled" to another element, it may be directly connected or coupled to the other element or intervening elements may be present.

In addition, descriptions of well-known functions and constructions may be omitted for clarity and conciseness of the inventive concepts.

A method of manufacturing the graphene fiber according to the first embodiment of the inventive concepts will be described hereinafter.

FIG. 1 is a flowchart illustrating a method of manufacturing a graphene fiber according to the first embodiment of the inventive concepts, FIG. 2 is a view illustrating a method of manufacturing a graphene fiber according to the first embodiment of the inventive concepts, and FIG. 3 is a view illustrating degree of orientation and elongation percentage of a graphene fiber according to the first embodiment of the inventive concepts.

Referring to FIGS. 1 and 2, a source solution 10 containing graphene oxide may be prepared (S100). The source solution 10 may be formed by adding the graphene oxide into a solvent. In some embodiments, the solvent may be water or an organic solvent. For example, the organic solvent may be one of dimethyl sulfoxide (DMSO), ethylene glycol, n-methyl-2-pyrrolidone (NMP) or dimethylformamide (DMF).

In an embodiment, the source solution 10 may be formed by adding the graphene oxide into the organic solvent at concentration of 2 to 20 mg/ml.

In an embodiment, a stirring process may be performed to the solvent containing the graphene oxide in order to improve dispersibility of the graphene oxide in the solvent. In an embodiment, the solvent containing the graphene oxide may be stirred in 24 hours.

In an embodiment, elongation percentage of the graphene fiber may be adjusted by concentration of the graphene oxide in the source solution 10. Specifically, degree of orientation and porosity of the graphene fiber may be adjusted by concentration of the graphene oxide in the source solution 10 such that the elongation percentage of the graphene fiber can be easily adjusted.

In an embodiment, the degree of orientation of the graphene fiber may be decreased and the porosity of the graphene fiber may be increased by increasing the concentration of the source solution 10. Accordingly, the elongation percentage of the graphene fiber may be increased by increasing the concentration of the source solution 10.

In an embodiment, orientation of the graphene in the graphene oxide which is contained in the source solution 10 may be adjusted by adding aqueous solution containing oxidizing agent in the source solution 10. Accordingly, micro pores in the graphene fiber may be adjusted by quantity of the oxidizing agent in the source solution 10 and/or reaction time of the aqueous solution containing the oxidizing agent and the source solution 10.

In an embodiment, the source solution may react at room temperature in 10 minutes through 4 hours after adding hydrogen peroxide aqueous solution into the source solution 10.

The source solution 10 may be supplied into a base solution 20 containing foreign element to form a graphene oxide fiber 30 (S200). In other words, the source solution 50 may be spun into the graphene oxide fiber 30 in the base solution 20. In an embodiment, the base solution 20 may be formed by adding a salt containing the foreign element in a solvent. In an embodiment, the salt containing foreign element may be a salt which contains an element except carbon and may be one of nitrogen-based salt, a sulfur-based salt, fluorine-based salt or iodine-based salt.

For example, the salt containing foreign element may be one of ammonium biborate tetrahydrate, ammonium bromide, ammonium carbamate, ammonium carbonate, ammonium cerium(IV) sulfate dihydrate, ammonium chloride, ammonium chromate, ammonium dichromate, ammonium dihydrogenphosphate, ammonium fluoride, ammonium formate, ammonium heptafluorotantalate(V), ammonium hexabromotellurate(IV), ammonium hexachloroiridate(III), ammonium hexachloroiridate(IV), ammonium hexachloroosmate(IV), ammonium hexachloropalladate(IV), ammonium hexachloroplatinate(IV), ammonium hexachlororhodate(III), ammonium hexachlororuthenate(IV), ammonium hexachlorotellurate(IV), ammonium hexafluorogermanate (IV), ammonium hexafluorophosphate, ammonium hexafluorophosphate, ammonium hexafluorosilicate, ammonium hexafluorostannate, ammonium hydrogen difluoride, ammonium hydrogenoxalate hydrate, ammonium hydrogensulfate, ammonium hypophosphite, ammonium iodide, ammonium metatungstate hydrate, ammonium metatungstate hydrate, ammonium metavanadate, ammonium molybdate, ammonium nitrate, ammonium oxalate monohydrate, ammonium pentaborate octahydrate, ammonium perchlorate, ammonium perrhenate, ammonium perrhenate, ammonium phosphate dibasic, ammonium phosphomolybdate hydrate, ammonium sodium phosphate dibasic tetrahydrate, ammonium sulfate, ammonium tetrachloroaurate(III) hydrate, ammonium tetrachloropalladate(II), ammonium tetrafluoroborate, ammonium tetrathiomolybdate, ammonium tetrathiotungstate, ammonium thiosulfate, ammonium titanyl oxalate monohydrate, ammonium trifluoromethanesulfonate, ammonium (para)tungstate hydrate, ammonium zirconium(IV) carbonate, tetrabutylammonium (meta)periodate, tetrabutylammonium perrhenate, tetraethylammonium tetrafluoroborate or tetramethylammonium formate.

In an embodiment, the solvent may be one of water, methanol, propanol, ethanol, acetone, dimethyl formamide (DMF), N-methyl-2-pyrrolidone (NMP), dimethylsulfoxide (DMSO) or ethylene glycol.

In an embodiment, the base solution 20 may further contain a coagulant. The graphene oxide fiber 30 formed by supplying the source solution 10 into the base solution 20 may be coagulated by a coagulant included in the base solution 20.

In an embodiment, the coagulant may be one of calcium chloride ($CaCl_2$)), potassium hydroxide (KOH), sodium hydroxide (NaOH), sodium chloride (NaCl), copper sulfate ($CuSO_4$), cetyltrimethylammonium bromide (CTAB) or chitosan.

In an embodiment, the base solution 20 may be formed by adding a salt containing the foreign element and the coagulant of 0 through 50 wt % in a solvent.

As shown in FIG. 2, the source solution 10 in a first container 100 may be supplied into a second container 150 containing the base solution through a spinneret 120 connected to the first container 100. While the source solution 10 is supplied into the base solution, the salt containing the foreign element may be dispersed in the graphene oxide fiber 30 caused by solvent exchange phenomenon.

In some embodiments, the elongation percentage of the graphene fiber to be described later may be adjusted by controlling a supply rate (spinning rate) of the source solution 10 supplied into the base solution 20. Specifically, degree of orientation and porosity of the graphene fiber may be adjusted by spinning rate of the source solution 10 such that the elongation percentage of the graphene fiber can be easily adjusted.

In an embodiment, the degree of orientation of the graphene fiber may be decreased and the porosity of graphene fiber may be increased as decreasing the spinning rate of the source solution 10. Accordingly, the elongation percentage of the graphene fiber may be increased as decreasing the spinning rate of the source solution 10.

In addition, electrical conductivity of the graphene fiber may be adjusted by species and/or content of the foreign element contained in the second solution. Specifically, the foreign element dispersed in the graphene oxide fiber 30 may be doped to the graphene fiber in a thermal treatment to be described later in S400. Accordingly, the electrical conductivity of the graphene fiber may be easily adjusted by controlling species and/or content of the foreign element contained in the base solution 20 in the step of S200.

The graphene oxide fiber 30 containing the foreign element may be obtained by cleaning and drying after separating the graphene oxide fiber 30 from the base solution 20 (S300). The graphene oxide fiber 30 may be separated from the second container 150 containing the base solution 20 and thus may exit to the outside by a guide roller. The graphene oxide fiber 30 separated from the base solution 20 may include the coagulant.

Thus, at least a portion of the coagulant remaining in the graphene oxide fiber 30 containing the foreign element may be removed through a cleaning process. In an embodiment, a cleaning solution used in the cleaning process may be an alcoholic aqueous solution.

In an embodiment, water included in the graphene oxide fiber 30 containing the foreign element may be naturally dried in air through the separating and cleaning processes.

In addition, the graphene oxide fiber 30 containing the foreign element which was naturally dried in air may be secondary dried through a heating process. In other words, at least a portion of water remaining in the graphene oxide fiber 30 containing the foreign element may be removed through a heating process.

In an embodiment, shape or kind of a heating unit used in the heating process is not limited to a specific shape or kind. For example, the heating unit may be one of a heater, a hot plate or a heating coil.

In an embodiment, the graphene oxide fiber 30 containing the foreign element naturally which was dried in air may be heated at temperature of 70 through 80° C. by the heating unit such that at least a portion of water remained in the graphene oxide fiber 30 containing the foreign element may be removed.

In an embodiment, the graphene oxide fiber 30 containing the foreign element may be wound simultaneously with dried through the heating process in the step of obtaining the graphene oxide fiber 30. As illustrated in FIG. 2, after the cleaning process, the graphene oxide fiber 30 may be wound by a winding roller 190 while the drying process is performed.

In an embodiment, winding rate of the graphene oxide fiber 30 may be controlled to adjust the elongation percentage of the graphene fiber. Specifically, degree of orientation and porosity of the graphene fiber may be adjusted by spinning rate of the graphene oxide fiber 30 such that the elongation percentage of the graphene fiber can be easily adjusted.

In an embodiment, the degree of orientation of the graphene fiber may be decreased and the porosity of the graphene fiber may be increased when the spinning rate of the source solution 10 is higher than the winding rate of the graphene oxide fiber 30 containing the foreign element. Thus, the elongation percentage of the graphene fiber may be increased when the spinning rate of the source solution 10 is higher than the winding rate of the graphene oxide fiber 30 containing the foreign element.

In an embodiment, the graphene oxide fiber 30 containing the foreign element may be dried through a drying rack. In this case, the elongation percentage of the graphene oxide fiber 30 containing the foreign element may be adjusted by controlling the length of the drying rack.

In an embodiment, when the length of the drying rack is shorter than the length of the graphene oxide fiber 30 containing the foreign element which is disposed on the drying rack, contraction of the graphene oxide fiber 30 containing the foreign element caused by tensile stress generated along the axis direction of the drying rack as the graphene oxide fiber 30 is dried. Thus, the degree of orientation of the graphene fiber may be decreased and the porosity of the graphene fiber may be increased. As a result, the elongation percentage of the graphene fiber may be increased when the length of the drying rack is shorter than the length of the graphene oxide fiber 30 containing the foreign element disposed on the drying rack.

The dried graphene oxide fiber 30 containing the foreign element may be treated by heating to form a graphene fiber doped with foreign element (S400). Specifically, the graphene oxide fiber 30 of the graphene oxide fiber 30 containing the foreign element may be reduced to the graphene fiber the moment the foreign element contained in the graphene oxide fiber 30 may be doped to the graphene fiber.

As described above, the electrical conductivity of the graphene fiber may be adjusted easily by species and/or content of the foreign element doped to the graphene fiber. In an embodiment, the foreign element may be one of nitrogen, sulfur, fluorine or iodine as an element except carbon.

In an embodiment, the step of forming the graphene fiber may include thermal treatment under inert gas or hydrogen ($H_2$) gas ambiance. For example, the inert gas may be one of argon gas or nitrogen gas.

In an embodiment, the graphene oxide fiber 30 containing the foreign element may be treated by heating at 100° C. to 5000° C. by increasing temperature at 10~100° C./min for 10 minutes to 10 hours under inert gas or hydrogen gas ambiance to form the graphene fiber doped with the foreign element.

In an embodiment, as a post-treatment process for the graphene fiber which was formed in the step of S400, a hydrothermal reaction may be performed after soaking the graphene fiber in an aqueous solution containing the oxidizing agent to form more micro pores in the graphene fiber. The micro pores which are more formed in the graphene fiber through the post treatment process for the graphene fiber may improve electrical and optical properties of the graphene fiber.

In an embodiment, the micro pores formed more in the graphene fiber may be easily adjusted by quantity of the oxidizing agent containing the aqueous solution and temperature and/or time of the hydrothermal reaction. Thus, the electrical and optical properties may be easily adjusted through the post-treatment process for the graphene fiber.

In some embodiments, the oxidizing agent may be hydrogen peroxide ($H_2O_2$).

In an embodiment, the micro pores formed more in the graphene fiber may be formed by soaking the graphene fiber in hydrogen peroxide solution of 1 through 35% and performing the hydrothermal reaction at 300° C. to 500° C. for 10 minutes to 4 hours in a high-pressure reactor.

In contrast to the embodiments of the inventive concept which is described above, a carbon-based fiber of the prior art has been applied to electronics and space industries because of superior electrical characteristic, thermal stability and tensile stress. However, the carbon-based fiber has limitation of applying for a flexible device and difficulty to act as a natural fiber because of low elongation percentage. The carbon-based fiber does not include micro structure and has small surface area, does not exhibit membrane characteristic and has disadvantage of weak electrical chemical property.

However, according to an embodiment of the inventive concept, the graphene fiber with superior mechanical strength and high tensile percentage may be provided by preparing the source solution 30 containing the graphene oxide, supplying the source solution 10 into the base solution 20 containing the foreign element to form the graphene oxide fiber 30, cleaning and drying after separating the graphene oxide fiber 30 from the base solution 20 to obtain the graphene oxide fiber 30 containing the foreign element, and performing thermal treatment to the graphene oxide fiber 30 containing the foreign element to form the graphene fiber doped with the foreign element.

The degree of orientation of the graphene fiber may be adjusted by controlling concentration of the graphene oxide in the source solution 10, spinning rate of the source solution 10 supplied into the base solution 20, winding rate of the graphene oxide fiber 30 containing the foreign element and/or length of the dry rack on which the graphene oxide fiber 30 containing the foreign element in the manufacturing of the graphene fiber.

The graphene fiber with low degree of orientation may have superior elongation percentage caused as increasing porosity of the graphene fiber. Thus, the graphene fiber having high mechanical strength and superior elongation percentage is obtained and then the graphene fiber is applicable to various fields including flexible devices.

The graphene fiber has porous structure and large surface area, and plays as a natural fiber, and thus the graphene fiber is widely applicable to a conventional membrane application field such as a fabric electronic device.

The electrical conductivity of the graphene fiber 70 may be adjusted easily by controlling species and/or content of the foreign element doped to the graphene fiber. Thus, the graphene fiber according to embodiments of the inventive concepts is applicable to various fields where superior electrical conductivity property is required.

A method of manufacturing the graphene fiber according to the second embodiment of the inventive concepts will be described hereinafter.

In contrast to the method of manufacturing the graphene fiber according to the first embodiment of the inventive concepts, a method of manufacturing a graphene fiber with superior mechanical strength and circularity may be provided by supplying a source solution containing a graphene oxide not into the base solution containing the foreign element but into a coagulation bath containing a reducing agent and a binder.

FIG. 4 is a flowchart illustrating a method of manufacturing a graphene fiber according to the second embodiment of the inventive concepts and FIG. 5 is a view illustrating a function of a binder in a coagulation bath which is used for a method of manufacturing a graphene fiber according to an embodiment of the inventive concepts.

In the second embodiment, the descriptions to the same technical features as in the first embodiment of FIGS. 1 through 3 will be referred to FIGS. 1 through 3.

Referring to FIGS. 4 and 5, a source solution 10 in which a graphene oxide sheet is dispersed may be prepared (S110). The source solution 10 may be formed by adding the graphene oxide sheet into a solvent. In some embodiments, the solvent may be water or an organic solvent. For example, the organic solvent may be one of dimethyl sulfoxide (DMSO), ethylene glycol, n-methyl-2-pyrrolidone (NMP) or dimethylformamide (DMF).

In an embodiment, a stirring process may be performed to the solvent containing the graphene oxide sheet in order to improve dispersibility of the graphene oxide sheet in the solvent.

In some embodiments, the elongation percentage of the graphene fiber to be described later may be adjusted by concentration of the graphene oxide sheet in the source solution 10. Specifically, degree of orientation and porosity of the graphene fiber may be adjusted by concentration of the graphene oxide sheet in the source solution 10.

Further specifically, the degree of orientation of the graphene fiber may be decreased and the porosity of the graphene fiber may be increased as increasing the concentration of the source solution 10. Accordingly, the elongation percentage of the graphene fiber may be increased as increasing the concentration of the source solution 10.

In an embodiment, the source solution 10 may not contain a polymer. Thus, it is minimized that electrical conductivity property is declined by the polymer.

The source solution 10 containing the graphene oxide sheet may be supplied into the coagulation bath 20 containing a reducing agent and a binder to obtain a graphene oxide fiber 30 (S120).

The coagulation bath 20 may include the reducing agent by which the graphene oxide sheet is partially reduced as well as a binder which is binding the graphene oxide sheet.

The reducing agent may partially reduce the graphene oxide sheet in the graphene oxide fiber 30. The mechanical strength, for example tensile strength of the graphene oxide fiber 30 in gel phase may be increased as increasing 7C-7C stacking in the partially reduced graphene oxide sheet. For example, the reducing agent may include one of KOH or NaOH.

The binder may include divalent or trivalent metallic ions. For example, the binder may include one of $CaCl_2$), NaCl or $CuSO_4$. As shown in FIG. 5, the oxygen may exist on the surface of the graphene oxide fiber 30. In this case, the divalent or trivalent metallic ions (cation) contained in the binder may link oxygens on the surface of the graphene oxide fiber 30 to reinforce bond of the graphene oxide sheet in the graphene oxide fiber 30. Thus, the mechanical properties of the graphene oxide fiber 30 in gel phase may be increased.

AS shown in FIG. 2, the graphene oxide fiber 30 may be separated from the second container 150 containing the coagulation bath 20 by a guide roller 170 and then drawn out and wound by the winding roller 190.

The graphene oxide fiber 30 may be reduced to form the graphene fiber (S130). The step of forming the graphene fiber may include drying the graphene oxide fiber 30, cleaning and drying the dried graphene oxide fiber 30 and performing thermal treatment to the cleaned and dried graphene oxide fiber 30 by soaking into the reduction solution to reduce the graphene oxide fiber 30. For example, the dried graphene oxide fiber 30 may be cleaned using an alcoholic aqueous solution and dried at 50 to 80° C. In addition, for example, the reduction solution may be hydrogen iodide aqueous solution.

In an embodiment, the graphene fiber may be cleaned and dried using the alcoholic alcohol after performing the reducing process using the reduction solution.

As shown in FIG. 2, the source solution 10 in a first container 100 may be supplied into a second container 150 containing the coagulation bath through a spinneret 120 connected to the first container 100. The source solution 10 may be spun into the graphene oxide fiber 30 in gel phase, and the graphene oxide fiber 30 may receive various hydraulic forces in the coagulation bath.

In contrast to the above embodiments of the inventive concept, the graphene oxide fiber 30 in gel phase may have low mechanical strength if the coagulation bath 20 does not include at least one of the reducing agent or the binder. In other word, if the coagulation bath 20 includes only one of the reducing agent or the binder, mechanical strength of the graphene oxide fiber 30 does not increase sufficiently such that the surface of the graphene oxide fiber 30 is uneven and circularity of the graphene fiber to be formed from the graphene oxide fiber 30 may be lowered.

However, as described above, according to embodiments of the inventive concepts, the coagulation bath 20 may include the reducing agent as well as the binder, and then the mechanical strength of the graphene oxide fiber 30 in gel phase which is provided into the coagulation bath 20 may be improved. Thus, the graphene oxide fiber 30 may have high circularity and the graphene fiber formed from the graphene oxide fiber 30 also may have high circularity.

The reducing agent may partially reduce the graphene oxide sheet in the graphene oxide fiber 30. In contrast, if the reducing agent fully reduces the graphene oxide sheet, it is not easy to exhaust the solvent (being contained in the source solution 10) in the graphene oxide fiber 30 through the drying process. However, as described above, the reducing agent in the coagulation bath 20 may partially reduce the graphene oxide sheet, and then the solvent in the graphene oxide fiber 30 may be exhausted through the drying process.

In an embodiment, the winding rate of the graphene oxide fiber 30 may be controlled to adjust the elongation percentage of the graphene fiber. As described by referring to FIGS. 1 to 3, the degree of orientation of the graphene oxide sheet in the graphene oxide fiber 30 may be adjusted by the winding rate of the graphene oxide fiber 30, and the degree of orientation and the porosity of the graphene sheet in the graphene fiber may be adjusted. Thus, the elongation percentage of the graphene fiber may be easily adjusted.

In other words, according to an embodiment of the inventive concepts, the graphene oxide fiber 30 may have high mechanical strength by the coagulation bath containing the reducing agent as well as the binder. Thus, the graphene oxide fiber 30 is not cut into parts even if the winding rate and the spinning rate of the graphene oxide fiber 30 are controlled. As result, the winding rate and the spinning rate of the graphene oxide fiber 30 may be easily controlled to adjust the elongation percentage, the porosity and degree of orientation of the graphene sheet in accordance with applications.

A method of manufacturing the graphene fiber according to the modified embodiment of the second embodiment of the inventive concepts will be described hereinafter.

FIGS. 6A and 6B are views illustrating a copper plated graphene fiber manufactured by a method of manufacturing a graphene fiber according to the first modification of the second embodiment of the inventive concepts.

Copper plate process may be further performed in the method of manufacturing the graphene fiber according to the second embodiment of the inventive concepts described by referring to FIGS. 4 and 5 to form a first modified embodiment of the second embodiment of the inventive concepts. Thus, the graphene fiber according to the first modified embodiment of the second embodiment may further include a copper structure which is formed interior or the surface of the graphene fiber.

Specifically, the step of the copper plated graphene fiber may include etching the graphene fiber, coupling a catalyst metal with the etched graphene fiber, soaking the graphene fiber coupled with the catalyst metal into the solution containing copper and reducing copper using the catalyst metal to plate the graphene fiber with copper. The catalyst metal may be easily coupled on the surface of the etched graphene fiber.

In an embodiment, the graphene fiber may be etched by soaking into acid solution of 50 to 90° C., for example 30% HCL or alkali solution, for example 5 to 20% NaOH. For example, the catalyst metal may be Pd, and graphene fiber may be coupled with the catalyst metal by soaking into a solution of 0.72M HCl, 0.01M $PdCl_2$ and 0.04M SnCl. In this case, the catalyst metal Pd may be reduced by Sn and coupled with the graphene fiber. In an embodiment, the step of plating the graphene fiber with copper may be performed by soaking the graphene fiber coupled with the catalyst metal into an electroless copper plating bath containing 5 g of $CuSO_4$, 25 g of Potassium sodium tartrate, 7 g of NaOH and 10 ml of Formaldehyde, for 1 to 10 minutes.

As shown in FIG. 6a, the cross-sectional view of the graphene fiber may include an aggregate 14 of a plurality of graphene fibers and a pore 16 between the aggregates. The copper plated graphene fiber according to the first modified embodiment of the second embodiment may include a pore 16 provided between the graphene sheets or a copper structure formed on the surface of the graphene fiber as well as the aggregate 14. In other words, as shown in FIG. 6b, the copper structure 18 may cover at least a portion of surface of the graphene fiber and/or fully or partially fill at least a portion of the pores 16 in the graphene fiber.

As described above, the graphene fiber may further include the copper structure 18 with high conductivity as well as aggregate 14 of the graphene sheet. Thus, the conductivity of the graphene fiber may be improved.

In a second modified embodiment of the inventive concepts, the method of manufacturing a graphene fiber according to the second embodiment of the inventive concepts which was described by referring to FIGS. 4 and 5 may further include a post-treatment process for improving the surface area of the graphene fiber according to the second embodiment fiber to form the graphene fiber according to the second modified embodiment of the second embodiment of the inventive concepts.

Further specifically, after forming the graphene fiber, the graphene fiber may be soaked into an oxidizing aqueous solution and hydrothermal reaction may be performed. Thus, micro pores may be formed on the surface of the graphene fiber. The surface area of the graphene fiber may be increased by the micro pores formed on the surface of the graphene fiber.

For example, the oxidizing aqueous solution may include hydrogen peroxide, DI water and $NH_4OH$, and the hydrothermal reaction may be performed at a process temperature of 150° C. in 30 minutes.

In a third modified embodiment of the second embodiment of the inventive concepts, the graphene fiber may be manufactured using the method of manufacturing a graphene fiber according to the second embodiment of the inventive concepts which was described by referring to FIGS. 4 and 5, and the graphene fiber may be manufactured using the source solution containing carbon nanotube as well as the graphene oxide sheet.

In other words, the graphene oxide sheet and the carbon nanotube are dispersed in the source solution, and the spinning process using the source solution may be performed by the method described in FIGS. 4 and 5 to form the graphene fiber. In this case, the graphene oxide fiber may include the graphene oxide sheet and the carbon nanotube. The graphene fiber according to the third modified embodiment of the second embodiment of the inventive concepts may include a graphene sheet which is reduced graphene oxide sheet and the carbon nanotube which is provided between the graphene sheets. Thus, the method may provide the graphene fiber of which mechanical and electrical characteristic is improved.

The graphene fiber according to the modified embodiments of the second embodiment of the inventive concepts may be used for various devices and apparatus such as an electric wire and a capacitor.

A method of manufacturing the graphene fiber according to the third embodiment of the inventive concepts will be described hereinafter.

In contrast to the method of manufacturing the graphene fiber according to the first and second embodiments of the inventive concepts, an oxidizing agent and pH adjusting agent may be added into the source solution containing the graphene oxide to form a graphene fiber capable of easily adjusting the elongation percentage.

First of all, referring to FIGS. 7 through 10, a method of forming a source solution for manufacturing the graphene fiber according to the third embodiment of the inventive concepts will be specifically disclosed.

FIG. 7 is a flowchart illustrating a method of manufacturing source solution for manufacturing a graphene fiber according to the third embodiment of the inventive concepts, FIG. 8 is a view illustrating a method of manufacturing source solution for manufacturing a graphene fiber according to the third embodiment of the inventive concepts, FIG. 9 is a view enlarging A of FIG. 8 and illustrating a graphene oxide with pores according to the third embodiment of the inventive concepts and FIG. 10 is a view enlarging B of FIG. 9 and illustrating specific structure of a graphene oxide with pores according to the third embodiment of the inventive concepts.

Referring to FIGS. 7 through 10, a graphene oxide 3, an oxidizing agent 5 and a pH adjusting agent 7 may be prepared (S100).

In an embodiment, the graphene oxide 3 may be provided in sheet shape. Further, in an embodiment, the sheet shaped graphene oxide 3 may include micro pores which are formed by irregular arrangement of the particles of the graphene oxide 3.

The oxidizing agent 5 may be material which is reduced itself simultaneously with oxidizes the graphene oxide 3 and may form pores 4 in the graphene oxide 3. In an embodiment, the oxidizing agent may be hydrogen peroxide $H_2O_2$ which has high oxidizing power.

The pH adjusting agent 7 may prepare a circumstance where the graphene oxide 3 and the oxidizing agent can react. In an embodiment, the pH adjusting agent 7 may be one of LiOH, NaOH, KOH, NH4OH, $Ca(OH)_2$, $Sr(OH)_2$, CsOH, $Ba(OH)_2$, $Mg(OH)_2$, $Cd(OH)_2$, $La(OH)_3$, $In(OH)_3$, $Nd(OH)_3$, $Gd(OH)_3$, FeOOH, RbOH, $Al(OH)_3$, $Ni(OH)_2$, NaF, $K_2Co_3$, or $NH_4ClO$.

The graphene oxide 3, the oxidizing agent 5 and the pH adjusting agent 7 may be added into the solvent 8 and reacted to form a source solution 10 in which the graphene oxide 3 having the pores 4 is dispersed.

In an embodiment, as described above, the oxidizing agent may be hydrogen peroxide ($H_2O_2$). As described following [Formula 1] and [Formula 2], hydrogen peroxide $H_2O_2$ and hydration ion $OH^-$ provided by the pH adjusting agent 7 are reacted with each other to generate $HO^{2-}$ ion and water ($H_2O$) if the graphene oxide 3, hydrogen peroxide $H_2O_2$ as the oxidizing agent 5 and the pH adjusting agent 7 is added into the solvent 8. In addition, the $HO^{2-}$ may be reacted with the hydrogen peroxide $H_2O_2$ to form OH radicals. The OH radical oxidizes the graphene oxide 3 and then the pore 4 may be formed in the graphene oxide of sheet shape.

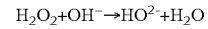
$H_2O_2+OH^-\rightarrow HO^{2-}+H_2O$ [Formula 1]

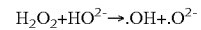
$H_2O_2+HO^{2-}\rightarrow .OH+.O^{2-}$ [Formula 2]

In an embodiment, the porosity of the graphene oxide 3 may be improved as increasing the content of the oxidizing agent 5 in the source solution 10. The quantity of the OH radical which is a reaction resultant of the oxidizing agent 5 and the pH adjusting agent 7 may be increased as increasing the content of the oxidizing agent 5 in the source solution 10. Thus, the number of the pores 4 in the graphene oxide 3 may be increased to increase the porosity of the sheet shaped graphene oxide 3.

In an embodiment, the content of the oxidizing agent 3 in the source solution 10 may be 0.1 to 40 wt %. If the content of the oxidizing agent 3 in the source solution 10 is at least 40 wt %, the OH radical which forms the pore 4 in the graphene oxide 3 by oxidizing the graphene oxide 3 may be limited to approach to the graphene oxide 3 such that reaction efficiency of the reaction by which the pore 4 is formed in the graphene oxide 3. In addition, the graphene oxide 3 may be aggregated and settles in the source solution 10.

In an embodiment, the higher pH of the source solution 10, the more increased porosity of the graphene oxide 3. The species and/or the content of the pH adjusting agent added in the source solution 10 may control pH environment in the solvent where the oxidizing agent 5 and the pH adjusting agent 7 are reacted. The quantity of the hydroxyl ion (OH⁻) which is provided from the pH adjusting agent 7 reacted with the oxidizing agent 5 may be increased as increasing the alkalinity or the content of the pH adjusting agent which is added in the source solution 10. Thus, number of the pores 4 in the graphene oxide 3 may be increased to increase the porosity of the sheet shaped graphene oxide 3.

In an embodiment, the pH of the source solution 10 may be 5 to 12. If the pH the source solution 10 is at least 13, the OH radical which forms the pore 4 in the graphene oxide 3 by oxidizing the graphene oxide 3 may be limited to approach to the graphene oxide 3 such that reaction efficiency of the reaction by which the pore 4 is formed in the graphene oxide 3. In addition, the graphene oxide 3 may be aggregated and settles in the source solution 10.

In an embodiment, as reaction temperature of the pH adjusting agent 7, the oxidizing agent 5 and the graphene oxide 3 in the solvent 8 is higher, the porosity of the graphene oxide 3 may be increasing. In other words, as the reaction temperature is higher, it may be enhanced to generate the OH radical which forms the pore 4 in the graphene oxide caused by the mechanism disclosed in the [Formula 1] and [Formula 2]. Thus, number of the pore 4 in the graphene oxide 3 may be increased to increase the porosity of the sheet shaped graphene oxide 3.

In an embodiment, the reaction temperature may be the room temperature (25° C.) to 250° C. In atmosphere at room temperature, the pore 4 may be formed in the graphene oxide 3 without involving the reduction reaction of the graphene oxide 3. Thus, the process for implementing a high temperature environment may be minimized to reduce process cost and provide the graphene oxide 3 with the pore 4 which has superior dispersibility.

As described above, the content of the oxidizing agent 5 in the source solution 10, the pH of the source solution 10 and the reactant temperature may be adjusted to control easily the porosity of the graphene oxide dispersed in the source solution 10. The porosity of the graphene oxide 3 is an essential factor to adjust electrical, thermal, optical and mechanical properties of the graphene oxide. Thus, according to the embodiment of the inventive concept, the electrical, thermal, optical and mechanical properties of the graphene oxide may be adjusted easily by controlling the porosity of the graphene oxide 3 using the simple method in which the temperature condition and/or the content of materials used in the manufacturing of the source solution 10 is controlled without catalyst or external energy.

Further, in the step of forming the source solution 10, the pore 4 may be formed in the graphene oxide without involving the reduction reaction of the graphene oxide 3 such that the graphene oxide 3 may keep high dispersibility in the source solution 10 like the graphene oxide 3 without the pore 4. The post process such as functional group formation, complication and doping of the graphene oxide may be enabled and characteristics of liquid crystal may be achieved by the high dispersibility of the graphene oxide in the source solution 10. Thus, the porosity of the graphene oxide layer 3 may be adjusted and the post process may be performed using the above method to control easily the property of the graphene oxide 3 and to enhance the property of the graphene oxide 3 efficiently.

In an embodiment, unreacted material in the source solution 10 may be removed after forming the source solution 10 with the pore 4. In an embodiment, the unreacted material in the source solution 10 may include the oxidizing agent 5 and the pH adjusting agent 7 which did not participate in the reaction.

In an embodiment, the graphene oxide 3 with pore 4 which is dispersed in the source solution 10 may be yielded as the form of powder. In an embodiment, the method of yielding the graphene oxide powder with pore 4 is not limited to specific methods. For example, one of a dialyzer membrane, centrifugation, phase separation, vacuum filter or lyophilization may be used to yield the graphene oxide powder with the pore 4.

A method of manufacturing a graphene fiber according to the third embodiment of the inventive concepts will be described using the source solution formed by the above method described in FIGS. 7 through 10.

FIG. 11 is a flowchart illustrating a method of manufacturing a graphene fiber according to the third embodiment of the inventive concepts.

In the description of the graphene fiber according to the third embodiment of the inventive concepts, the descriptions to the same technical features as in the first and the second embodiments of FIGS. 1 to 10 will be referred to FIGS. 1 to 10.

Referring to FIGS. 11 and 3, a source solution 10 in which graphene oxide 3 is dispersed may be prepared (S1000). The step of preparing the source solution 10 with the graphene oxide 3 may be the same as the method of forming the source solution 10 which is described by referring to FIGS. 7 to 10.

In an embodiment, the content of the oxidizing agent 5 in the source solution 10, the pH of the source solution 10 and the reactant temperature may be adjusted to control the porosity of the graphene oxide 3.

In an embodiment, as the content of the oxidizing agent 5 in the source solution 10, the pH of the source solution 10 and the reaction temperature are higher, the porosity of the graphene oxide 3 may be increasing.

In an embodiment, the elongation percentage of the graphene fiber to be described later may be adjusted by concentration of the graphene oxide 3 in the source solution 10. Specifically, degree of orientation and the porosity of the graphene fiber may be adjusted by concentration of the graphene oxide 3 in the source solution 10 such that the elongation percentage of the graphene fiber may be easily adjusted.

In an embodiment, the degree of orientation of the graphene fiber may be decreased and the porosity of the graphene fiber may be increased by increasing the concentration of the source solution 10. Accordingly, the elongation percentage of the graphene fiber may be increased as increasing the concentration of the source solution 10.

The source solution 10 may be supplied into a base solution 20 containing foreign element to form a graphene oxide fiber 30 (S2000). In an embodiment, the base solution 20 may be formed by adding a salt containing the foreign element in a solvent. In an embodiment, the salt containing foreign element may be a salt containing an element except carbon and may be one of nitrogen-based salt, a sulfur-based salt, fluorine-based salt or iodine-based salt.

In an embodiment, the base solution 20 may further contain a coagulant. The graphene oxide fiber formed by supplying the source solution 10 into the base solution 20 may be coagulated by a coagulant included in the base solution 20.

As described by referring to FIG. 2, the source solution 10 contained in a first container 100 may be supplied into a second container 150 containing the base solution 20 through a spinneret 120 connected to the first container 100. While the source solution 10 is supplied into the base solution, the salt containing the foreign element may be dispersed in the graphene oxide fiber caused by solvent exchange phenomenon.

In some embodiments, the elongation percentage of the graphene fiber to be described later may be adjusted by controlling a supply rate of the source solution 10 supplied into the base solution 20. Specifically, degree of orientation and porosity of the graphene fiber may be adjusted by spinning rate of the source solution 10 such that the elongation percentage of the graphene fiber can be easily adjusted.

In an embodiment, the degree of orientation of the graphene fiber may be decreased and the porosity of graphene fiber may be increased as decreasing the spinning rate of the source solution 10. Accordingly, the elongation percentage of the graphene fiber may be increased as decreasing the spinning rate of the source solution 10.

In addition, electrical conductivity of the graphene fiber may be adjusted by species and/or content of the foreign element contained in the base solution 20. Specifically, the foreign element dispersed in the graphene oxide fiber may be doped to the graphene fiber in a thermal treatment to be described later in S4000. Accordingly, the electrical conductivity of the graphene fiber may be easily adjusted by controlling species and/or content of the foreign element contained in the base solution 20 in the step of S2000.

The graphene oxide fiber 30 containing the foreign element may be obtained by separating the graphene oxide fiber 30 and cleaning and drying (S3000). By a guide roller 170, the graphene oxide fiber may be separated from the second container 150 containing the base solution 20 and thus may exit to the outside. The graphene oxide fiber 30 separated from the base solution 20 may include the coagulant.

Thus, at least a portion of the coagulant remaining in the graphene oxide fiber 30 may be removed by a cleaning process. In some embodiments, a cleaning solution used in the cleaning process may be an alcoholic aqueous solution.

In an embodiment, water included in the graphene oxide fiber 30 containing the foreign element may be naturally dried in air through the separating and cleaning processes.

In addition, the graphene oxide fiber 30 containing the foreign element naturally dried in air may be additionally dried through a heating process. In other words, at least a portion of water remaining in the graphene oxide fiber 30 containing the foreign element may be removed through a heating process.

In an embodiment, a shape or kind of a heating unit used in the heating process is not limited to a specific shape or kind. For example, the heating unit may be one of a heater, a hot plate, or a heating coil.

In an embodiment, the graphene oxide fiber 30 containing the foreign element naturally dried in air may be heated at temperature of 70 through 80° C. by the heating unit such that at least a portion of water remaining in the graphene oxide fiber 30 containing the foreign element may be removed.

In an embodiment, the graphene oxide fiber 30 containing the foreign element may be wound simultaneously with dried through the heating process in the step of obtaining the graphene oxide fiber 30. As illustrated in FIG. 2, after the cleaning process, the graphene oxide fiber 30 may be wound by a winding roller 190 while the drying process is performed.

In an embodiment, a winding rate of the graphene oxide fiber 30 may be controlled to adjust the elongation percentage of the graphene fiber. Specifically, degree of orientation and porosity of the graphene fiber may be adjusted by spinning rate of the graphene oxide fiber 30 such that the elongation percentage of the graphene fiber can be easily adjusted.

In an embodiment, the degree of orientation of the graphene fiber may be decreased and the porosity of the graphene fiber may be increased when the spinning rate of the source solution 10 is higher than the winding rate of the graphene oxide fiber 30 containing the foreign element. Thus, the elongation percentage of the graphene fiber may be increased when the spinning rate of the source solution 10 is higher than the winding rate of the graphene oxide fiber 30 containing the foreign element.

In an embodiment, the graphene oxide fiber 30 containing the foreign element may be dried through a drying rack. In this case, the elongation percentage of the graphene oxide fiber 30 containing the foreign element may be adjusted by controlling the length of the dry rack.

In an embodiment, when the length of the drying rack is shorter than the length of the graphene oxide fiber 30 containing the foreign element which is disposed on the drying rack, contraction of the graphene oxide fiber 30 containing the foreign element caused by tensile stress generated along the axis direction of the drying rack as the graphene oxide fiber 30 is dried. Thus, the degree of orientation of the graphene fiber may be decreased and the porosity of the graphene fiber may be increased. As a result, the elongation percentage of the graphene fiber may be increased when the length of the drying rack is shorter than the length of the graphene oxide fiber 30 containing the foreign element disposed on the drying rack, The dried graphene oxide fiber 30 containing the foreign element may be treated by heating to form a graphene fiber doped with foreign element (S4000). Specifically, the graphene oxide fiber of the graphene oxide fiber 30 containing the foreign element may be reduced to the graphene fiber the moment the foreign element contained in the graphene oxide fiber may be doped to the graphene fiber.

As described above, the electrical conductivity of the graphene fiber may be adjusted easily by species and/or content of the foreign element doped to the graphene fiber 30. In an embodiment, the foreign element may be an element except carbon, may be one of nitrogen, sulfur, fluorine or iodine.

In an embodiment, the step of forming the graphene fiber may include thermal treatment under inert gas or hydrogen ($H_2$) gas ambiance. For example, the inert gas may be one of argon or nitrogen.

In an embodiment, the graphene oxide fiber 30 containing the foreign element may be treated by heating at 100° C. through 5000° C. by increasing temperature at 10~100° C./min for 10 minutes through 10 hours under inert gas or hydrogen gas ambiance to form the graphene fiber doped with the foreign element.

In addition, as described referring FIGS. 7 to 11, the thermal treatment process of the post process may be performed by the pore 4 formed in the graphene oxidizing agent fiber 30 containing the foreign element according to the embodiment of the inventive concepts. Thus, the graphene oxide fiber may be doped with the foreign element.

The graphene oxide fiber 30 containing the foreign element may be formed into the graphene fiber through the post process and the electrical and optical properties of the graphene fiber may be easily adjusted.

The graphene fiber may be reacted with an aqueous solution containing a first oxidizing agent (S5000). In an embodiment, the first oxidizing agent may be the same as the oxidizing agent 5 described by referring to FIGS. 1 to 4 and the oxidizing agent 5 used in the forming of the source solution 10 at the S1000. In an embodiment, the oxidizing agent may be hydrogen peroxide ($H_2O_2$).

In an embodiment, as the post process of the graphene fiber, hydrothermal reaction may be performed after soaking the graphene fiber in the aqueous solution containing the first oxidizing agent such that the micro pores may be more formed in the graphene fiber. The micro pores which are more formed in the graphene fiber through the post process for the graphene fiber may improve electrical and optical properties of the graphene fiber.

In an embodiment, the micro pores formed more in the graphene fiber may be easily adjusted by quantity of the first oxidizing agent containing the aqueous solution and the temperature and/or time of the hydrothermal reaction.

Thus, pore 4 which is formed in the graphene fiber according to the embodiment of the inventive concepts may permit the post-process. Thus, the electrical and optical properties may be easily adjusted by the post-process for the graphene fiber.

In an embodiment, the micro pores formed more in the graphene fiber may be formed by soaking the graphene fiber in a hydrogen peroxide solution of 1 through 35% and then performing the hydrothermal reaction at 300° C. to 500° C. for 10 minutes to 4 hours in a high-pressure reactor.

In contrast to the above embodiment of the inventive concepts, the graphene with pores of a conventional art may be manufactured by a dry process or a wet process. The manufacturing the graphene with pores through the dry process uses high temperature process over 600° C. using a metallic catalyst such as K, Fe or Ni. In this case, a heterogeneous reaction may be occurred to form pores only at a contact point of the metallic catalyst and the graphene oxide. In addition, process cost should be increased for removing and recovering after the reaction, and the metallic catalyst and high energy should be required in order to adjust high reaction environment.

Further, in the method of manufacturing the graphene with pores through the wet process, a heavy acid and external energy such as heat and/or UV should be required such that the process becomes complicated and process cost is increasing.

In addition, the graphene oxide is partially or fully reduced caused by significant energy exerted in the process to obtain the graphene with pores when the graphene with pores is manufactured using the dry process and the wet process. If the graphene oxide with pores is manufactured by reducing partially portion of the graphene oxide, the dispersibility is low and then the aggregation is occurred such that it is difficult to control the properties of the graphene oxide through the post process.

The graphene oxide 3, the oxidizing agent 5 and the pH adjusting agent 7 may be added into the solvent 10 and reacted form a source solution 10 in which provide graphene oxide 3 having the pores 4 is dispersed.

The content of the oxidizing agent 5 in the source solution 10, the pH of the source solution 10 and the reactant temperature may be adjusted to control easily the porosity of the graphene oxide dispersed in the source solution 10. Thus, the electrical, thermal, optical and mechanical properties of the graphene oxide may be adjusted easily by controlling the porosity of the graphene oxide 3 through the simple method in which the temperature condition and/or the content of materials used in the manufacturing of the source solution 10 is controlled without catalyst or external energy.

Further, as described above, the catalyst and the heavy acid is not used and a simple solution process performed in an ambient condition without necessity of external energy, and then the graphene oxide 3 with pores 4 is capable of mass production because the cost for removing and recovering the catalyst and the heavy acid is reduced and process window is wide.

Further, the pore 4 may be formed in the graphene oxide without involving the reduction reaction of the graphene oxide 3 such that the graphene oxide 3 may keep high dispersibility in the source solution 10 like the graphene oxide 3 without the pore 4. The post process such as functional group formation, complication and doping of the graphene oxide may be enabled and a characteristic of liquid crystal may be achieved by the high dispersibility of the graphene oxide in the source solution 10. Thus, using the above method, the porosity of the graphene oxide layer 3 may be adjusted and the post-process may be performed using the above method to control easily the property of the graphene oxide 3 and to enhance the property of the graphene oxide 3 efficiently.

The degree of orientation of the graphene fiber may be adjusted by controlling concentration of the graphene oxide in the source solution 10, a spinning rate of the source solution 10 supplied into the base solution 20, a winding rate of the graphene oxide fiber 30 containing the foreign element, and/or a length of the drying rack on which the graphene oxide fiber 30 containing the foreign element in the manufacturing of the graphene fiber.

The graphene fiber with low degree of orientation may have superior elongation percentage caused by increased porosity of the graphene fiber. Thus, the graphene fiber with high mechanical strength and superior elongation percentage is obtained and then the graphene fiber is applicable to various fields including flexible devices.

The graphene fiber has porous structure, large surface area and plays as a natural fiber, and then the graphene fiber is widely applicable to a conventional membrane application field such as a fabric electronic device.

In addition, the species and/or the content of the foreign element doped to the graphene fiber may be adjusted to control the electric conductivity of the graphene fiber. Thus, the graphene fiber according to embodiments of the inventive concepts is applicable to various fields where superior electrical conductivity property is required.

In addition, the pores which are formed in the graphene oxide fiber containing the foreign element according to the embodiment of the inventive concepts may permit the thermal treatment process of the post-process which is performed to the graphene fiber containing the foreign element. Thus, the graphene oxide fiber may be reduced to form the graphene fiber simultaneously with doping of the foreign element such that the electrical and optical properties are easily adjusted.

In addition, the pores which are formed in the graphene fiber may permit the additional post process. Thus, the micro pores may be more formed in the graphene fiber through the post-process to control efficiently the electrical and optical properties of the graphene fiber.

Characteristics test of the graphene fiber according to embodiments of the inventive concepts will be described hereinafter.

Characteristic evaluation of the graphene fiber manufactured by the first embodiment of the inventive concepts will be described hereinafter.

Manufacture of Graphene Fiber According to the First Embodiment

The graphene oxide was added into DI water, and stirred in 24 hours to form a source solution containing the graphene oxide. A salt containing a foreign element such as ammonium chloride, ammonium sulfate or ammonium phosphate and aggregation agent $CaCl_2$), KOH, NaOH, NaCl, $CuSO_4$, Cetyltrimethylammonium bromide (CTAB) or chitosan was added in an alcohol based aqueous solution to form a base solution containing the foreign element. The source solution was supplied into the base solution through a spinneret which is connected to the end of the first container containing the source solution to form a graphene oxide fiber. The graphene oxide fiber was separated from the base solution to form a graphene oxide fiber containing the foreign element. The coagulation agent remained in the graphene oxide fiber containing the foreign element was removed using the alcohol based aqueous solution and the graphene oxide fiber containing the foreign element was dried by heating at temperature of 70° C. to 80° C. through a heater. And then, thermal treatment was performed to the dried graphene oxide fiber containing the foreign element under inert gas atmosphere (100 to 5000° C., 10 to 100° C./min, 10 minutes to 10 hours) to form the graphene fiber doped with the foreign element according to the first embodiment of the inventive concepts.

FIG. 12 illustrates a process in which a source solution is supplied through a spinneret to form a graphene oxide fiber according to the first embodiment of the inventive concepts.

Applicants observed a process of forming the graphene oxide fiber by supplying the source solution into the base solution through the spinneret which is connected to the end of the first container containing the source solution after forming the source solution according to the first embodiment.

Referring to FIG. 12, it was shown that the source solution was supplied into the base solution through the spinneret to form the graphene oxide fiber. It is understood that a salt containing the foreign element in the base solution was diffused in the graphene oxide fiber by the solvent exchange phenomenon during the supplying of the source solution into the base solution.

FIG. 13 illustrates a process in which a graphene oxide fiber containing a foreign element is wound by a winding roller according to the first embodiment of the inventive concepts.

Applicants observed a process of winding the graphene oxide fiber by the winding roller after forming the graphene oxide fiber containing the foreign element according to the first embodiment.

Referring to FIG. 13, it was shown that the graphene oxide fiber containing the foreign element separated from the base solution was wound by the winding roller simultaneously with dried after cleaning. Since the porosity of the graphene fiber is increased as lowering the degree of orientation of the graphene fiber if the winding rate of the graphene oxide fiber containing the foreign element is lower than the spinning rate of the source solution, it is understood that the graphene fiber with superior elongation percentage may be provided.

FIG. 14 is an image of a graphene fiber with low degree of orientation according to the first embodiment of the inventive concepts.

According to the method of manufacturing the graphene fiber in the first embodiment, in order to reduce the degree of orientation of the graphene fiber, the concentration of the graphene oxide in the source solution or the spinning rate of the source solution was reduced or the winding rate of the graphene oxide fiber containing the foreign element was lowered than the spinning rate of the source solution to form the graphene fiber.

Referring to FIG. 14, it is shown that the porosity of the graphene fiber was increased to manufacture the graphene fiber with superior elongation percentage by lowering the degree of orientation of the finally manufactured graphene fiber when the concentration of the graphene oxide in the source solution or the spinning rate of the source solution was reduced or the winding rate of the graphene oxide fiber containing the foreign element was lowered than the spinning rate of the source solution to form the graphene fiber in order to reduce the degree of orientation of the graphene fiber, FIG. 15 is an image of a graphene fiber with high degree of orientation according to the first embodiment of the inventive concepts.

According to the method of manufacturing the graphene fiber in the first embodiment, in order to increase the degree of orientation of the graphene fiber, the concentration of the graphene oxide in the source solution was reduced, the spinning rate of the source solution was increased or the winding rate of the graphene oxide fiber containing the foreign element made higher than the spinning rate of the source solution to form the graphene fiber.

Referring to FIG. 15, it is shown that the porosity of the graphene fiber was decreased to manufacture the graphene fiber with lower elongation percentage because the degree of orientation of the finally manufactured graphene fiber is high when the concentration of the graphene oxide in the source solution is reduced or the spinning rate of the source solution was increased or the winding rate of the graphene oxide fiber containing the foreign element was made higher than the spinning rate of the source solution to form the graphene fiber in order to increase the degree of orientation of the graphene fiber.

From the result of FIGS. 14 and 15, the degree of orientation of the graphene fiber may be adjusted by controlling concentration of the graphene oxide in the source solution 10, spinning rate of the source solution supplied into the base solution, winding rate of the graphene oxide fiber containing the foreign element and/or length of the dry rack on which the graphene oxide fiber containing the foreign element in the manufacturing of the graphene fiber in the manufacturing of the graphene fiber. Thus, it is shown that the manufacturing of graphene fiber 70 could adjust the elongation percentage easily according to electrical and physical properties using a simple method controlling the concentration, the spinning rate and so on.

FIG. 16 is a graph illustrating tensile strength value by increasing external strain of a graphene fiber according to an embodiment of the inventive concepts.

The graphene fibers with low degree of orientation and high degree of orientation were manufactured using the same method described by referring to FIG. 16. A change of external pressure put to the graphene fiber was measured for the graphene fibers with the low degree of orientation and high degree of orientation until the graphene fiber ruptured.

Referring to FIG. 16, it was shown that the tensile stress required to rupture the graphene fiber with high degree of orientation is 2% and the tensile strength required to rupture the graphene with low degree of orientation is 15%. Accordingly, it is shown that the graphene fiber with low degree of orientation has the elongation percentage superior than the graphene fiber with high degree of orientation. This is understood from the result in which the graphene fiber with high degree of orientation is more flexible than the graphene fiber with low degree of orientation because the graphene fiber with low degree of orientation are bigger than the graphene fiber with high degree of orientation in the porosity.

Characteristic evaluation of the graphene fiber manufactured by the second embodiment of the inventive concepts will be described hereinafter.

Manufacture of the Graphene Fiber According to the Second Embodiment 1

The graphene oxide sheet was dispersed in DI water to prepare a source solution in which the graphene oxide sheet was dispersed and the coagulation bath containing 4.5 wt % of $CaCl_2$ as a binder and 0.5 wt % of KOH as a reducing agent was prepared. The source solution was supplied into the coagulation bath through a spinneret of 400 μm to form a graphene oxide fiber. The graphene oxide fiber was dried after coagulating in the coagulation bath, cleaned using ethanol solution in order to remove remained coagulation bath and dried in an oven.

And then, the graphene fiber which was dried was soaked in ionized solution, reduced at temperature of 70 to 80° C., cleaned using ethanol and dried to form the graphene fiber according to the embodiment 1.

Manufacture of the Graphene Fiber According to a Comparative Example 1

The graphene fiber was manufactured under the same process condition as the second embodiment 1, and, however, the graphene fiber according to the comparative example 1 was manufactured using the coagulation bath containing 5 wt % of $CaCl_2$).

Manufacture of the Graphene Fiber According to a Comparative Example 2

The graphene fiber was manufactured under the same process condition as the second embodiment 1, and, however, the graphene fiber according to the comparative example 2 was manufactured using the coagulation bath containing 5 wt % of KOH.

FIG. 17 illustrates images of graphene fibers according to the second embodiment 1 of the inventive concepts, the first comparative example and a second comparative example and FIG. 18 is a graph showing circularity of graphene fibers according to the second embodiment 1 of the inventive concepts, the first comparative example and a second comparative example.

Referring to FIG. 17, (a), (b) and (c) of FIG. 17 are pictures of the graphene fibers according to the comparative example 1, the second embodiment 1 and comparative example 2, respectively. As shown in FIG. 17, the graphene fiber according to the second embodiment 1 which was manufactured using the coagulation bath containing the $CaCl_2$) and KOH has cross section of well-shaped circle in comparison with the graphene fibers according to the comparative examples 1 and 2 which was manufactured using the coagulation bath containing one of $CaCl_2$) or KOH.

Referring to FIG. 18, circularity of the graphene fiber according to the comparative examples 1 and 2 which was manufactured using the coagulation bath containing one of the $CaCl_2$ or KOH was calculated in accordance with the following [Equation 1]

Circularity=4 $\pi A/(P2)$($A$: Sectional Area, $P$: Circumference of cross section) [Equation 1]

The graphene fiber according to the comparative examples 1 and 2 which was manufactured using the coagulation bath containing one of $CaCl_2$) or KOH has large deviation of circularity and remarkably low circularity in comparison with the graphene fiber according to the second embodiment 1 which was manufactured using the coagulation bath containing $CaCl_2$) and KOH.

It is shown that the graphene fiber according to the second embodiment 1 has circularity of at least 0.8 and low deviation of circularity. In other words, it is shown that the manufacture of the graphene fiber using the coagulation bath containing the binder and the reducing agent is effective method of manufacturing the graphene fiber having high circularity of at least 0.8.

FIG. 19 illustrates images of graphene fiber surfaces according to the second embodiment 1 of the inventive concepts, the comparative examples 1and the comparative example 2 and FIG. 20 is a graph showing standard deviation of thickness of graphene fibers according to the second embodiment 1 of the inventive concepts, the comparative example 1 and the comparative example 2.

Referring to FIG. 19, (a), (b) and (c) of FIG. 19 are pictures of the graphene fiber surfaces according to the comparative example 1, the second embodiment 1 and comparative example 2, respectively. As shown in FIG. 19, the graphene fiber according to the second embodiment 1 which was manufactured using the coagulation bath containing the $CaCl_2$) and KOH has remarkably high uniformity of thickness in comparison with the graphene fibers according to the comparative examples 1 and 2 which was manufactured using the coagulation bath containing one of $CaCl_2$) or KOH.

The graphene fiber according to the comparative examples 1 and 2 which was manufactured using the coagulation bath containing one of $CaCl_2$) or KOH has remarkably high standard deviation of thickness in comparison with the graphene fiber according to the second embodiment 1 which was manufactured using the coagulation bath containing $CaCl_2$) and KOH.

In other words, it is shown that the manufacture of the graphene fiber using the coagulation bath containing the binder and the reducing agent is effective method for manufacturing the graphene fiber having substantially uniform thickness.

Manufacture of the Graphene Fiber According to the Second Embodiment 2

The graphene oxide sheet was dispersed in DI water to prepare a source solution in which the graphene oxide sheet 1.0 mg/ml and the coagulation bath containing 4.5 wt % of $CaCl_2$) as a binder and 0.5 wt % of KOH as a reducing agent was prepared. The source solution was supplied into the coagulation bath through a spinneret of 400 μm to form a graphene oxide fiber. The graphene oxide fiber was dried after coagulating in the coagulation bath, cleaned using ethanol solution in order to remove remained coagulation bath, and dried in an oven.

And then, the graphene fiber which was dried was soaked in ionized solution, reduced at temperature of 70 to 80° C., cleaned using ethanol, and dried to form the graphene fiber according to the embodiment 2.

Manufacture of the Graphene Fiber According to the Second Embodiment 3

The graphene fiber was manufactured under the same process condition as the second embodiment 2, and however, the graphene fiber according to the second embodiment 3 was manufactured using the coagulation bath containing $AlCl_3$ as the binder and KOH as the reducing agent.

Manufacture of the Graphene Fiber According to the Second Embodiment 4

The graphene fiber was manufactured under the same process condition as the second embodiment 2, and however, the graphene fiber according to the second embodiment 4 was manufactured using the coagulation bath containing $FeCl_3$ as the binder and KOH as the reducing agent.

FIG. 21 is an AFM image of a graphene oxide sheet used for manufacturing a graphene oxide fiber according to the second embodiments 2 through 4 of the inventive concepts, and FIG. 22 illustrates images of source solution, source solution containing $CoCl_2$, $AlCl_3$ or $FeCl_3$ according to the second embodiments 2 through 4 of the inventive concepts.

Referring to FIGS. 21 and 22, AFM topology and thickness of the graphene oxide sheet which had been used in the second embodiments 2 to 4 was measured. The thickness of the graphene oxide fiber was measured in about 1.2 nm.

In addition, the source solution which was manufactured by dispersing the graphene oxide sheet in DI water using a mild sonication, and the source solution in which $CoCl_2$, $AlCl_3$ and $FeCl_3$ are added respectively was photographed.

FIG. 23 illustrates images of source solution, source solution containing $CoCl_2$, $AlCl_3$ or $FeCl_3$ according to the second embodiments 2 through 4 of the inventive concepts for measuring viscosity, FIG. 24 is a viscosity graph of source solution, source solution containing $CoCl_2$, $AlCl_3$ or $FeCl_3$ according to the second embodiments 2 through 4 of the inventive concepts, FIG. 25 is a storage modulus graph of source solution, source solution containing $CoCl_2$, $AlCl_3$ or $FeCl_3$ according to the second embodiments 2 through 4 of the inventive concepts and FIG. 26 is a gelation degree graph of source solution, source solution containing $CoCl_2$, $AlCl_3$ or $FeCl_3$ according to the second embodiments 2 through 4 of the inventive concepts.

Referring to FIG. 23, it is shown that most of the source solution flows down because of low viscosity when the source solution used in the second embodiment 2 through the second embodiment 4 is turned over. In addition, it is shown that most of the source solution flows down because of low viscosity in case that LiCl containing a monovalent metal was added into the source solution.

On the other side, it is shown that a large quantity of solution was remained on the upper portion of the container even if the container was turned over since viscosity was increased and the solution became gelation by $CoCl_2$, $AlCl_3$ or $FeCl_3$ if $CoCl_2$, $AlCl_3$ or $FeCl_3$ was added into the source solution.

In addition, referring to FIGS. 24 through 26, it is shown that viscosity is increased remarkably and storage modulus is increased remarkably if $CoCl_2$, $AlCl_3$ or $FeCl_3$ is added in the source solution respectively. In contrast to adding $COCl_2$ which contains a divalent metal, it is shown that viscosity and storage modulus is remarkably high if $AlCl_3$ and $FeCl_3$ containing a trivalent metal.

In other words, if a binder containing a divalent or trivalent metallic ion such as $CoCl_2$, $AlCl_3$ or $FeCl_3$ is added in the source solution in which the graphene oxide sheet is dispersed, oxygen of the graphene oxide sheet is combined with the divalent or trivalent metallic ion to reinforce bonds of the graphene oxide sheets as described by referring to FIG. 4. As illustrated in FIG. 26, it is shown that the source solution is being gelation.

Thus, it is shown that mechanical strength of the graphene oxide fiber is enhanced when the source solution containing dispersed graphene oxide sheet was supplied into the coagulation bath having the binder containing the divalent or trivalent metallic ion such as $CoCl_2$, $AlCl_3$ or $FeCl_3$.

FIG. 27 is an XRD graph of a graphene oxide fiber according to the second embodiments 2 through 4 of the inventive concepts, FIG. 28 is a mechanical strength graph of a graphene oxide fiber according to the second embodiments 2 through 4 of the inventive concepts and FIG. 29 is an image of a graphene oxide fiber according to the second embodiment 2 of the inventive concepts.

Referring to FIG. 27, the graphene oxide fiber according to the second embodiments 2 through 4 was measured by XRD. As illustrated in FIG. 27, d spacing of the graphene oxide sheet in the graphene oxide fiber was measured at 8.08 Å when the source solution was supplied in the coagulation bath without the binder such as $CoCl_2$, $AlCl_3$ or $FeCl_3$ to form the graphene oxide fiber (pristine GO fiber). In addition, d spacing of the graphene oxide sheet in the graphene oxide fiber was measured at 8.79 Å, 9.01 Å and 9.51 Å when the source solution was supplied in the coagulation bath containing the binder such as $CoCl_2$, $AlCl_3$ or $FeCl_3$ to form the graphene oxide fiber, respectively. It is shown that d spacing of the graphene oxide sheet in the graphene oxide fiber is increased according to valence number of cations.

Referring to FIG. 28, mechanical strength of the graphene oxide fiber according to the second embodiments 2 through 4 was measured. The source solution was supplied into the coagulation bath without the binder such as $CoCl_2$, $AlCl_3$ or $FeCl_3$ to form the graphene oxide fiber (pristine GO fiber) and supplied into the coagulation bath containing the binder such as $CoCl_2$, $AlCl_3$ or $FeCl_3$ to form the graphene oxide fiber, and the mechanical strengths of the graphene oxide fibers were arranged in following [Table 1].

TABLE 1

| Classification | Strength (MPa) | Stiffness (GPa) | Elongation at |
|---|---|---|---|
| pristine GO fiber | — | — | — |
| Second Embodiment 2 | 407.24: | 75.4: | 0.65: |
| Second embodiment 3 | 464.16: | 88.1: | 0.62: |
| Second embodiment 4 | 510.53: | 107.0: | 0.58: |

It is shown that the mechanical property is too weak to measure strength, stiffness and elongation at break when the source solution was supplied in the coagulation bath without the binder such as $CoCl_2$, $AlCl_3$ or $FeCl_3$ to form the graphene oxide fiber (pristine GO fiber).

However, it is shown that the graphene oxide fibers according to the second embodiment 2 through the second embodiment 4 have high mechanical strength and strength and stiffness is increased and elongation at break is decreased as increasing valence number of the metallic ion which was used as the binder.

In other words, it is shown that the mechanical property is increased when the graphene oxide fiber was spun using the coagulation bath without the binder such as $CoCl_2$, $AlCl_3$ and $FeCl_3$.

Referring to FIG. 29, the graphene oxide fiber according to the second embodiment 2 was bent. As illustrated in FIG. 29, it is shown that the graphene oxide sheets are combined by Co ions to have high flexibility.

Characteristic evaluation of the graphene fiber manufactured by the third embodiment of the inventive concepts will be described hereinafter.

Manufacture of the Source Solution According to the Third Embodiment

Graphene oxide of 0.01 through 10 wt %, $H_2O_2$ solution of 0.1 through 40 wt % as oxidizing agent and pH adjusting agent (LiOH, NaOH, KOH, $NH_4OH$, $Ca(OH)_2$, $Sr(OH)_2$, CsOH, $Ba(OH)_2$, $Mg(OH)_2$, $Cd(OH)_2$, $La(OH)_3$, $In(OH)_3$, $Nd(OH)_3$, $Gd(OH)_3$, FeOOH, RbOH, $Al(OH)_3$, $Ni(OH)_2$, NaF, $K2Co_3$, or $NH_4ClO$) was added into DI water as the solvent and reaction was performed at room temperature (25° C.) to form the source solution.

Manufacture of the Source Solution According to a Comparative Example of the Third Embodiment The source solution was formed using the same method as the method of manufacturing the source solution according to the third embodiment, however, weight of the hydrogen peroxide as the oxidizing agent was at least 40 wt % and the pH adjusting agent was added excessively in order to get the source solution of at least pH 13 to form the source solution according to the comparative example.

Manufacture of the Graphene Fiber According to the Third Embodiment

The source solution in which the graphene oxide with pores was formed using the method of manufacturing the source solution according to the third embodiment. A salt such as ammonium chloride, ammonium sulfate or ammonium phosphate and aggregation agent $CaCl_2$), KOH, NaOH, NaCl, $CuSO_4$, Cetyltrimethylammonium bromide (CTAB) or chitosan which contains containing a foreign element was added in an alcohol based aqueous solution to form a base solution containing the foreign element. The source solution was supplied into the base solution through a spinneret which is connected to the end of the first container containing the source solution to form a graphene oxide fiber. The graphene oxide fiber was separated from the base solution to form a graphene oxide fiber containing the foreign element. The aggregation agent remained in the graphene oxide fiber containing the foreign element was removed using the alcohol based aqueous solution and the graphene oxide fiber containing the foreign element was dried by heating at temperature of 70 through 80° C. through a heater. Thermal treatment under inert gas atmosphere (100~5000° C., 10~100° C./min, 10 minutes ~10 hours) was performed for the graphene oxide fiber containing the dried foreign element to form the graphene fiber doped with the foreign element according to the third embodiment of the inventive concepts.

FIG. 30 is a SEM image of a graphene oxide fiber with pores according to the third embodiment of the inventive concepts. Specifically, (a) of FIG. 30 is a SEM image of the graphene oxide with pores dispersed in the source solution according to the third embodiment of the inventive concepts and (b) of FIG. 30 is high magnification SEM image of the graphene oxide according to the third embodiment of the inventive concepts which is disclosed in (a) of FIG. 30.

The source solution was formed using the same method of the method of manufacturing the source solution according to the third embodiment. Images of the surface of the graphene oxide dispersed in the source solution according to the third embodiments of the inventive concepts were measured using a scanning electron microscope (SEM).

Referring to (a) and (b) of FIG. 30, it is shown that the graphene oxide in the source solution according to the third embodiment of the inventive concepts has a porous structure having pores. It is understood that the pores of graphene oxide are formed by OH radicals formed by hydrogen peroxide corresponding to the oxidizing agent added in the manufacture of the source solution.

FIG. 31 is an image of source solution according to the third embodiment of the inventive concepts.

Characteristics of dispersion was observed to the graphene oxide in the source solution according to the third embodiment of the inventive concepts after manufacturing the source solution according the method of manufacturing the source solution according to the third embodiment.

Referring to FIG. 31, it is shown that the graphene oxide is stably dispersed in the source solution without aggregation. It is understood that proper quantity of the oxidizing agent and the pH adjusting agent were used in the manufacture of the source solution according to the third embodiment of the inventive concepts to occur uniform reaction among the graphene oxide, the oxidizing agent and the pH adjusting agent.

FIG. 32 is an image of source solution according to comparative example of the third embodiment of the inventive concepts.

Characteristics of dispersion was observed for the graphene oxide in the source solution according to the comparative example of the third embodiment of the inventive concept after manufacturing the source solution using excessive quantity of the oxidizing agent and the pH adjusting agent according to the method of manufacturing the source solution according to the comparative example.

Referring to FIG. 32, it is shown that the graphene oxide is aggregated to form sediments. It is understood that the excessive quantity of the oxidizing agent (>40 wt %) and the pH adjusting agent (>pH 13) were used to aggregate the graphene oxide in contrast to the third embodiment of the inventive concepts. Therefore, it is shown that OH radicals generated by hydrogen peroxide as the oxidizing agent are limited to approach to the aggregated graphene oxide and then the graphene oxide, the oxidizing agent and the pH adjusting agent are not reacted uniformly.

Manufacture of the Graphene Fiber According to the 4-1 Embodiment

Graphene oxide was added to DI water, and then stirred for 24 hours to prepare a source solution containing the graphene oxide. A coagulation bath was prepared by adding $NH_4CN$ and $NH_4SCN$ containing nitrogen and sulfur, which are foreign elements, to DI water. The added salt may serve to coagulate the graphene oxide.

The source solution was spun into the coagulation bath to form graphene oxide fibers, and the graphene oxide fibers containing the foreign elements (nitrogen and sulfur) were dried at a temperature of 70 to 80° C. Thereafter, the graphene oxide fiber containing the foreign elements was heat-treated (600° C., 1 hour) in an argon gas atmosphere to form a graphene fiber doped with the foreign element of 4-1 embodiment.

Manufacture of the Graphene Fiber According to the 4-2 Embodiment

The graphene fiber was manufactured under the same process condition as the 4-1 embodiment, and however omitting the precursors of the foreign elements $NH_4CN$ and $NH_4SCN$, to prepare a graphene fiber of 4-2 embodiment.

FIG. 33 is a SEM photograph of graphene fibers according to 4-1 embodiment and 4-2 embodiment of the present application.

Referring to FIG. 33, SEM photographing was performed on the graphene fibers according to 4-1 and 4-2 embodiment described above. FIG. 33(a) is a photograph of the graphene fiber according to the 4-2 embodiment, and FIG. 33(b) is a photograph of graphene fiber according to the 4-1 embodiment.

As FIG. 33, in the case of the graphene fiber that are not doped with the foreign elements such as nitrogen and sulfur, it can be seen that the ratio of pores in the cross section of the graphene fibers is remarkably low. On the other hand, in the case of the graphene fiber doped with the foreign elements such as nitrogen and sulfur, it can be seen that the ratio of pores in the cross section of the graphene fiber is remarkably high.

In conclusion, through a presence of doping and an amount of doping for the foreign elements such as nitrogen and sulfur in the graphene sheet, whether or not the pores are generated in the cross section of the graphene fiber and the ratio of the pores may be controlled. In addition, controlling a presence of doping and an amount of doping for the foreign elements such as nitrogen and sulfur in the graphene sheet is an efficient method of controlling the mechanical properties of the graphene fibers.

Manufacture of the Graphene Fiber According to 5-1 Embodiment

Graphene oxide was added to DI water and then stirred for 24 hours to prepare a source solution containing the graphene oxide. A coagulation bath containing $CaCl_2$ as a coagulant was prepared.

The source solution was spun into the coagulation bath to form graphene oxide fibers, and the graphene oxide fibers were dried at a temperature of 70 to 80° C. Thereafter, the graphene oxide fiber was heat-treated (600° C., 1 hour) in an argon gas atmosphere to form a graphene fiber according to 5-1 embodiment.

Manufacture of the Graphene Fiber According to 5-2 Embodiment

The graphene fiber was manufactured under the same process condition as the 5-1 embodiment, and however, using the coagulation bath containing copper(CuCl2), to prepare a graphene fiber of 5-2 embodiment.

Manufacture of the Graphene Fiber According to 5-3 Embodiment

The graphene fiber was manufactured under the same process condition as the 5-1 embodiment, and however, using the coagulation bath containing nickel($NiCl_2$), to prepare a graphene fiber of 5-3 embodiment.

FIG. 34 is a SEM photograph of graphene fibers according to 5-1 embodiment to 5-3 embodiment of the present application.

Referring to FIG. 34, SEM photographing was performed on the graphene fibers according to the 5-1 to 5-3 embodiment described above. FIG. 34(a) is a photograph of the graphene fiber according to the 5-1 embodiment, FIG. 34(b) is the graphene fiber according to the 5-2 embodiment, FIG. 34(c) is a photograph of the graphene fiber according to the 5-3 embodiment.

As can be seen in FIG. 34, when the graphene fibers are prepared using a coagulation bath containing the foreign elements of a metal such as copper or nickel, copper particles and nickel particles crystallized through heat treatment are generated on the surface of the graphene fibers and inside the graphene fibers.

In conclusion, it can be seen that by using the coagulation bath containing a metal, the metal particles can be generated on the surface and inside of the graphene fiber so that the physical properties of the graphene fiber may be controlled.

Manufacture of the Graphene Fiber According to 6-1 Embodiment 35 wt % of hydrogen peroxide, 28 wt % of ammonia aqueous solution ($NH_4OH$, pH adjusting agent), and graphene oxide were added to DI water and stirred to prepare a source solution containing the graphene oxide having pores. Then, a coagulation bath containing calcium chloride as a coagulant was prepared.

The source solution was spun into the coagulation bath to prepare graphene oxide fibers, and the graphene oxide fibers were dried at a temperature of 70 to 80° C. Thereafter, the graphene oxide fiber was heat-treated (3000° C., 1 hour) in an argon gas atmosphere to prepare a graphene fiber of 6-1 embodiment.

Manufacture of the Graphene Fibers According to 6-2 Embodiment

The graphene fiber was manufactured under the same process condition as the 6-1 embodiment, and however omitting the hydrogen peroxide and the pH adjusting agent, to prepare a graphene fiber of 6-2 embodiment.

FIG. 35 is an SEM photograph of a cross section of graphene fibers according to 6-1 embodiment and 6-2 embodiment of the present application.

Referring to FIG. 35, SEM photographing was performed on the graphene fibers according to the 6-1 embodiment and 6-2 embodiment described above. FIG. 35(a) is photographed the graphene fiber according to the 6-2 embodiment, and FIG. 35(b) is photographed the graphene fiber according to the 6-1 embodiment.

As FIG. 35, when the graphene fibers are manufactured using the graphene oxide without pores, it can be seen that the ratio of pores to the cross-section of the graphene fibers is high. On the other hand, when the graphene fibers were manufactured using the graphene oxide having pores, it can be seen that the ratio of pores to the cross-section of the graphene fibers was remarkably low. In other words, in the case of the graphene oxide without pores, due to the high bending modulus, a large number of pores exist inside the graphene fiber using the graphene oxide without pores, but in the case of the graphene oxide with pores, due to the low bending modulus, it can be seen that the pores in the inside of the graphene fibers using the graphene oxide with pores are significantly reduced.

In conclusion, it is possible to control whether or not pores are generated in the cross section of the graphene fiber and the ratio of pores in the cross section of the graphene fiber by adjusting whether or not the pores are generated in the graphene sheet in the graphene fiber. And it is possible to control whether or not pores are generated in the cross section of the graphene fiber and the ratio of pores in the cross section of the graphene fiber by adjusting the size of the pores in the graphene sheet in the graphene fiber. And it is possible to control whether or not pores are generated in the cross section of the graphene fiber and the ratio of pores in the cross section of the graphene fiber by adjusting the amount of the pores in the graphene sheet in the graphene fiber. In addition, it can be seen that it is an efficient method to control the mechanical properties of the graphene fiber by controlling whether or not the pores are generated inside the graphene sheet, the size of the pores, and the amount of the pores.

FIG. 36 is a graph measuring the mechanical strength of the graphene fiber according to the size of the pores of the graphene sheet contained in the graphene fiber according to an embodiment of the present application.

Referring to FIG. 36, the graphene fiber according to 6-1 embodiment described above was prepared, but by controlling the reaction time between the graphene oxide and ammonia hydrogen peroxide, the size of the pores of the graphene sheet was 1 to 500 nm. The size of the pores in the graphene sheet may be controlled by the reaction time, and the pores may be generated during the reaction and the pores may be expanded at the same time.

As FIG. 36, it can be seen that the mechanical properties of the graphene fibers can be improved when the pores are present in the graphene sheet compared to the case where the pores do not exist in the graphene sheet.

In particular, compared to the size(diameter) of the pores in the graphene sheet is 1~2 nm or 1~500 nm, when the size(diameter) of the pores in the graphene sheet is 1~5 nm, mechanical properties are significantly improved.

In conclusion, it can be seen that controlling the size (diameter) of the pores in the graphene sheet to 1~5 nm is an efficient method of improving the mechanical properties of the graphene fibers.

According to embodiments of the inventive concepts, the source solution containing the graphene oxide is supplied into the base solution containing the foreign element or the reducing agent and the binder to form the graphene fiber, and thermal treatment or acid treatment is performed to provide the graphene fiber having high elongation percentage as well as superior mechanical strength and electrical conductivity.

The degree of orientation of the graphene fiber can be easily adjusted by controlling concentration of the graphene oxide in the source solution, spinning rate of the source solution supplied into the base solution, winding rate of the graphene oxide fiber containing the foreign element, and/or length of the drying rack on which the graphene oxide fiber containing the foreign element, in the manufacture of the graphene fiber.

The graphene fiber with low degree of orientation may have superior elongation percentage caused by increased porosity of the graphene fiber. Thus, the graphene fiber having high mechanical strength and superior elongation percentage is obtained and then the graphene fiber is applicable to various fields including flexible devices.

The graphene fiber has porous structure and large surface area, and plays as a natural fiber, and thus the graphene fiber is widely applicable to a conventional membrane application field such as a fabric electronic device.

The electrical conductivity of the graphene fiber may be adjusted easily by controlling species and/or content of the foreign element doped to the graphene fiber. Thus, the graphene fiber according to embodiments of the inventive concepts is applicable to various fields where superior electrical conductivity property is required.

The graphene fiber according to embodiments of the inventive concepts will be widely applicable to various devices and apparatus such as a flexible device, fabric electronics, electric wires and a capacitor.

While the inventive concepts have been described with reference to exemplary embodiments, the scopes of the inventive concepts are to be determined by the broadest permissible interpretation of the following claims and their equivalents, and shall not be restricted or limited by the foregoing description. In addition, it should be understood that it will be apparent to those skilled in the art that various changes and modifications may be made without departing from the spirits and scopes of the inventive concepts.

What is claimed is:

1. A graphene fiber composite comprising:
a graphene fiber in which a plurality of graphene sheets is aggregated to extend in one direction,
wherein a pore is provided between the plurality of graphene sheets inside the graphene fiber, and
wherein a circularity of the graphene fiber is 0.8 or more, said circularity of the graphene fiber being calculated as shown in Equation 1 below:

$$\text{Circularity} = 4\pi A/(P^2) \qquad \text{<Equation 1>}$$

wherein, in Equation 1,
A is sectional area of the graphene fiber, and
P is circumference of cross section of the graphene fiber.

2. The graphene fiber composite of claim 1, wherein the plurality of graphene sheets includes a first graphene sheet having a pore therein, and a second graphene sheet having no pore therein.

3. The graphene fiber composite of claim 1, wherein the plurality of graphene sheets has pores therein, and the size of the pores of the graphene sheet is 1 to 500 nm.

4. The graphene fiber composite of claim 1, wherein the graphene fiber composite further includes a metal structure attached to surface of the graphene fiber and inside of the pore.

5. The graphene fiber composite of claim 1, wherein the graphene fiber composite further includes carbon nanotubes provided between the plurality of the graphene sheets.

6. The graphene fiber composite of claim 1, wherein the graphene sheet is doped with a foreign element.

7. The graphene fiber composite of claim 6, wherein as doping amount of the foreign element doped on the graphene sheet increases, a ratio of pores in the cross section of the graphene fiber increases.

8. The graphene fiber composite of claim 6, wherein the foreign element includes at least one of nitrogen, sulfur, fluorine, or iodine.

9. A wire structure, the wire structure comprising:
the graphene fiber composite according to the claim 1; and
an insulator covering the graphene fiber composite.

* * * * *

UNITED STATES PATENT AND TRADEMARK OFFICE
CERTIFICATE OF CORRECTION

| | | |
|---|---|---|
| PATENT NO. | : 11,649,566 B2 | Page 1 of 1 |
| APPLICATION NO. | : 17/240528 | |
| DATED | : May 16, 2023 | |
| INVENTOR(S) | : Han et al. | |

It is certified that error appears in the above-identified patent and that said Letters Patent is hereby corrected as shown below:

On the Title Page

Under item (72) Inventors:
Add as 3rd and 4th Inventors --Wonsik EOM, Seoul (KR); Ki Hyun LEE, Seoul (KR)--.

Signed and Sealed this
Fourth Day of July, 2023

Katherine Kelly Vidal
*Director of the United States Patent and Trademark Office*